United States Patent
Liebenow et al.

(10) Patent No.: US 10,762,598 B2
(45) Date of Patent: Sep. 1, 2020

(54) MIXED REALITY SYSTEM WITH COLOR VIRTUAL CONTENT WARPING AND METHOD OF GENERATING VIRTUAL CONTENT USING SAME

(71) Applicant: MAGIC LEAP, INC., Plantation, FL (US)

(72) Inventors: Michael Harold Liebenow, Loxahatchee, FL (US); Reza Nourai, Danville, CA (US); Robert Blake Taylor, Porter Ranch, CA (US); Fahri Yaras, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/924,078

(22) Filed: Mar. 16, 2018

(65) Prior Publication Data

US 2018/0268519 A1    Sep. 20, 2018

Related U.S. Application Data

(60) Provisional application No. 62/473,145, filed on Mar. 17, 2017.

(51) Int. Cl.
*G06T 19/00* (2011.01)
*G06T 3/00* (2006.01)
*G06F 3/01* (2006.01)

(52) U.S. Cl.
CPC ............ *G06T 3/0093* (2013.01); *G06F 3/012* (2013.01); *G06T 19/006* (2013.01)

(58) Field of Classification Search
CPC ...... G06T 3/0093; G06T 19/006; G06F 3/012
See application file for complete search history.

(56) References Cited

U.S. PATENT DOCUMENTS

| | | |
|---|---|---|
| 4,462,165 A | 7/1984 | Lewis |
| 5,280,265 A | 1/1994 | Kramer et al. |

(Continued)

FOREIGN PATENT DOCUMENTS

| | | |
|---|---|---|
| CA | 2358682 | 3/1994 |
| CN | 101093586 | 12/2007 |

(Continued)

OTHER PUBLICATIONS

PCT Invitation to Pay Additional Fees for International Appln. No. PCT/US18/23011, Applicant Magic Leap, Inc. dated Jul. 23, 2018 (18 pages).

(Continued)

*Primary Examiner* — Phong X Nguyen
(74) *Attorney, Agent, or Firm* — Vista IP Law Group, LLP

(57) ABSTRACT

A computer implemented method for warping multi-field color virtual content for sequential projection includes obtaining first and second color fields having different first and second colors. The method also includes determining a first time for projection of a warped first color field. The method further includes determining a second time for projection of a warped second color field. Moreover, the method includes predicting a first pose at the first time and predicting a second pose at the second time. In addition, the method includes generating the warped first color field by warping the first color field based on the first pose. The method also includes generating the warped second color field by warping the second color field based on the second pose.

18 Claims, 14 Drawing Sheets

(56) References Cited

U.S. PATENT DOCUMENTS

| | | | |
|---|---|---|---|
| 5,583,974 A | 12/1996 | Winner et al. | |
| 5,592,401 A | 1/1997 | Kramer | |
| 5,684,498 A * | 11/1997 | Welch | G02B 27/017 345/13 |
| 5,784,115 A * | 7/1998 | Bozdagi | H04N 7/012 348/448 |
| 5,930,741 A | 7/1999 | Kramer | |
| 6,377,401 B1 | 4/2002 | Bartlett | |
| 6,407,736 B1 | 6/2002 | Regan | |
| 6,701,296 B1 | 3/2004 | Kramer et al. | |
| 7,375,529 B2 | 5/2008 | Dupuis et al. | |
| 7,443,154 B1 | 10/2008 | Merewether et al. | |
| 8,165,352 B1 | 4/2012 | Mohanty et al. | |
| 8,401,308 B2 | 3/2013 | Nakamura et al. | |
| 8,950,867 B2 | 2/2015 | Macnamara | |
| 9,013,505 B1 | 4/2015 | Thorton | |
| 9,160,727 B1 | 10/2015 | Saylor et al. | |
| 9,215,293 B2 | 12/2015 | Miller | |
| 9,417,452 B2 | 8/2016 | Schowengerdt et al. | |
| 9,465,129 B1 | 10/2016 | Olsson et al. | |
| 9,671,566 B2 | 6/2017 | Abovitz et al. | |
| 9,791,700 B2 | 10/2017 | Schowengerdt | |
| 9,814,430 B1 | 11/2017 | Berme et al. | |
| 9,874,749 B2 | 1/2018 | Bradski et al. | |
| 9,952,673 B2 | 4/2018 | Kramer et al. | |
| 2001/0043738 A1 | 11/2001 | Sawney et al. | |
| 2002/0033803 A1 | 3/2002 | Holzrichter et al. | |
| 2002/0180727 A1 | 12/2002 | Guckenberger et al. | |
| 2003/0092448 A1 | 5/2003 | Forstrom et al. | |
| 2003/0120448 A1 | 7/2003 | Moriya et al. | |
| 2003/0234823 A1 | 12/2003 | Sato et al. | |
| 2004/0140949 A1 | 7/2004 | Takagi | |
| 2004/0174337 A1 | 9/2004 | Kubota et al. | |
| 2004/0201857 A1 | 10/2004 | Foxlin | |
| 2005/0107870 A1 | 5/2005 | Wang et al. | |
| 2005/0156601 A1 | 7/2005 | Dupuis et al. | |
| 2006/0161871 A1 | 7/2006 | Hotelling et al. | |
| 2006/0253804 A1 | 11/2006 | Fukushima et al. | |
| 2007/0049374 A1 | 3/2007 | Ikeda et al. | |
| 2007/0072674 A1 | 3/2007 | Ohta et al. | |
| 2007/0298883 A1 | 12/2007 | Feldman et al. | |
| 2008/0024523 A1 | 1/2008 | Tomite et al. | |
| 2008/0133521 A1 | 6/2008 | Podilchuk | |
| 2008/0275667 A1 | 11/2008 | Ohta | |
| 2008/0309884 A1 | 12/2008 | O'Dor et al. | |
| 2009/0005166 A1 | 1/2009 | Sato | |
| 2009/0051653 A1 | 2/2009 | Barney et al. | |
| 2009/0115406 A1 | 5/2009 | Anderson et al. | |
| 2009/0173886 A1 | 7/2009 | Chowdhury | |
| 2009/0184825 A1 | 7/2009 | Anderson | |
| 2010/0066676 A1 | 3/2010 | Kramer et al. | |
| 2010/0085423 A1 | 4/2010 | Lange | |
| 2010/0103205 A1 * | 4/2010 | Iisaka | G09G 3/3413 345/690 |
| 2010/0141261 A1 | 7/2010 | Overby et al. | |
| 2010/0302152 A1 | 12/2010 | Kirigaya | |
| 2010/0309292 A1 | 12/2010 | Ho et al. | |
| 2011/0018874 A1 | 1/2011 | Hasselgreen et al. | |
| 2011/0025603 A1 | 2/2011 | Underkoffler et al. | |
| 2011/0184950 A1 | 7/2011 | Skaff et al. | |
| 2011/0199088 A1 | 8/2011 | Bittar et al. | |
| 2011/0238399 A1 | 9/2011 | Ophir et al. | |
| 2011/0248987 A1 | 10/2011 | Mitchell | |
| 2011/0298748 A1 | 12/2011 | Chen et al. | |
| 2012/0099800 A1 | 4/2012 | Llano et al. | |
| 2012/0117076 A1 | 5/2012 | Austermann et al. | |
| 2012/0194516 A1 | 8/2012 | Newcombe et al. | |
| 2012/0236030 A1 | 9/2012 | Border et al. | |
| 2012/0328196 A1 | 12/2012 | Kasahara et al. | |
| 2013/0084984 A1 | 4/2013 | Gagner et al. | |
| 2013/0117377 A1 | 5/2013 | Miller | |
| 2013/0128230 A1 | 5/2013 | Macnamara | |
| 2013/0169626 A1 | 7/2013 | Balan et al. | |
| 2013/0230211 A1 | 9/2013 | Tanabiki et al. | |
| 2013/0241773 A1 | 9/2013 | Laine | |
| 2013/0278635 A1 | 10/2013 | Maggiore | |
| 2013/0290222 A1 | 10/2013 | Gordo et al. | |
| 2013/0312009 A1 | 11/2013 | Kramer et al. | |
| 2013/0321462 A1 | 12/2013 | Salter et al. | |
| 2013/0346168 A1 | 12/2013 | Zhou et al. | |
| 2014/0006026 A1 | 1/2014 | Lamb et al. | |
| 2014/0011589 A1 | 1/2014 | Barney et al. | |
| 2014/0037140 A1 | 2/2014 | Benhimane et al. | |
| 2014/0062841 A1 | 3/2014 | Ishikawa et al. | |
| 2014/0075060 A1 | 3/2014 | Sharp et al. | |
| 2014/0139226 A1 | 5/2014 | Jaaskelainen et al. | |
| 2014/0145932 A1 | 5/2014 | Underkoffler et al. | |
| 2014/0176591 A1 * | 6/2014 | Klein | G09G 3/003 345/589 |
| 2014/0181587 A1 | 6/2014 | Sridharan et al. | |
| 2014/0195988 A1 | 7/2014 | Kramer et al. | |
| 2014/0212027 A1 | 7/2014 | Hallquist et al. | |
| 2014/0222409 A1 | 8/2014 | Efrat et al. | |
| 2014/0225822 A1 | 8/2014 | Underkoffler et al. | |
| 2014/0267420 A1 | 9/2014 | Schowengerdt et al. | |
| 2014/0267646 A1 | 9/2014 | Na'Aman et al. | |
| 2014/0285375 A1 | 9/2014 | Crain | |
| 2014/0298269 A1 | 10/2014 | Underkoffler et al. | |
| 2014/0306866 A1 | 10/2014 | Miller et al. | |
| 2014/0321702 A1 | 10/2014 | Schmalstieg | |
| 2014/0323148 A1 | 10/2014 | Schmalstieg et al. | |
| 2014/0325373 A1 | 10/2014 | Kramer et al. | |
| 2014/0354548 A1 | 12/2014 | Lee | |
| 2015/0002542 A1 * | 1/2015 | Chan | G06F 3/048 345/633 |
| 2015/0019651 A1 | 1/2015 | Kazi et al. | |
| 2015/0040074 A1 | 2/2015 | Hofmann et al. | |
| 2015/0077326 A1 | 3/2015 | Kramer et al. | |
| 2015/0092015 A1 | 4/2015 | Stafford | |
| 2015/0100380 A1 | 4/2015 | Jones, Jr. et al. | |
| 2015/0100593 A1 | 4/2015 | Underkoffler et al. | |
| 2015/0161476 A1 | 6/2015 | Kurz et al. | |
| 2015/0163345 A1 | 6/2015 | Cornaby et al. | |
| 2015/0172568 A1 | 6/2015 | Choe et al. | |
| 2015/0177831 A1 | 6/2015 | Chan et al. | |
| 2015/0178554 A1 | 6/2015 | Kanaujia et al. | |
| 2015/0178939 A1 | 6/2015 | Bradski et al. | |
| 2015/0205126 A1 | 7/2015 | Schowengerdt | |
| 2015/0205364 A1 | 7/2015 | Underkoffler et al. | |
| 2015/0205388 A1 | 7/2015 | Osterhout | |
| 2015/0215611 A1 | 7/2015 | Wu et al. | |
| 2015/0221133 A1 | 8/2015 | Groten et al. | |
| 2015/0243080 A1 | 8/2015 | Steinbach et al. | |
| 2015/0262372 A1 | 9/2015 | Cardoso et al. | |
| 2015/0302652 A1 | 10/2015 | Miller et al. | |
| 2015/0310310 A1 | 10/2015 | Hesch | |
| 2015/0324198 A1 | 11/2015 | Alsup et al. | |
| 2015/0339857 A1 | 11/2015 | O'Connor et al. | |
| 2015/0346495 A1 | 12/2015 | Welch et al. | |
| 2015/0358539 A1 | 12/2015 | Catt | |
| 2015/0371082 A1 | 12/2015 | Csaszar et al. | |
| 2015/0373369 A1 | 12/2015 | Jalai et al. | |
| 2015/0379772 A1 | 12/2015 | Hoffman | |
| 2016/0005233 A1 | 1/2016 | Fraccaroli et al. | |
| 2016/0012643 A1 | 1/2016 | Kezele et al. | |
| 2016/0018896 A1 | 1/2016 | Kramer et al. | |
| 2016/0026253 A1 | 1/2016 | Bradski et al. | |
| 2016/0041048 A1 | 2/2016 | Blum et al. | |
| 2016/0147065 A1 * | 5/2016 | Border | G02B 27/017 345/592 |
| 2016/0171644 A1 | 6/2016 | Gruber | |
| 2016/0180151 A1 | 6/2016 | Philbin et al. | |
| 2016/0180592 A1 | 6/2016 | Bean et al. | |
| 2016/0189680 A1 | 6/2016 | Paquette | |
| 2016/0203624 A1 | 7/2016 | Anderson | |
| 2016/0210783 A1 | 7/2016 | Tomlin et al. | |
| 2016/0259032 A1 | 9/2016 | Hehn | |
| 2016/0259404 A1 | 9/2016 | Woods | |
| 2016/0262608 A1 | 9/2016 | Krueger | |
| 2016/0282619 A1 * | 9/2016 | Oto | G02B 27/017 |
| 2016/0294958 A1 | 10/2016 | Zhang et al. | |
| 2016/0299567 A1 * | 10/2016 | Crisler | H04N 13/324 |
| 2016/0378863 A1 | 12/2016 | Shlens et al. | |
| 2016/0379092 A1 | 12/2016 | Kutliroff | |

(56) References Cited

U.S. PATENT DOCUMENTS

| | | | |
|---|---|---|---|
| 2017/0011555 A1 | 1/2017 | Li et al. | |
| 2017/0032220 A1 | 2/2017 | Medasani et al. | |
| 2017/0076328 A1 | 3/2017 | Suzuki | |
| 2017/0098406 A1* | 4/2017 | Kobayashi | G09G 3/36 |
| 2017/0161853 A1 | 6/2017 | Gossweiler et al. | |
| 2017/0161919 A1 | 6/2017 | Schroeder | |
| 2017/0184387 A1 | 6/2017 | Lefevre et al. | |
| 2017/0205903 A1 | 7/2017 | Miller et al. | |
| 2017/0243324 A1* | 8/2017 | Mierle | G06T 3/0093 |
| 2017/0345398 A1* | 11/2017 | Fuchs | G06F 3/147 |
| 2018/0039083 A1 | 2/2018 | Miller et al. | |
| 2018/0047332 A1* | 2/2018 | Kuwahara | G09G 3/2096 |
| 2018/0107346 A1 | 4/2018 | Wilson | |
| 2018/0213359 A1 | 7/2018 | Reinhardt et al. | |
| 2018/0268518 A1 | 9/2018 | Nourai et al. | |
| 2018/0268610 A1 | 9/2018 | Nourai et al. | |
| 2019/0015167 A1 | 1/2019 | Draelos et al. | |
| 2019/0056693 A1 | 2/2019 | Gelman et al. | |
| 2019/0155374 A1 | 5/2019 | Miller et al. | |
| 2020/0027194 A1 | 1/2020 | Nourai et al. | |

FOREIGN PATENT DOCUMENTS

| | | |
|---|---|---|
| CN | 101530325 | 9/2009 |
| CN | 103792661 | 5/2014 |
| CN | 104011788 | 8/2014 |
| EP | 2887311 | 6/2015 |
| WO | WO 94/04938 | 3/1994 |
| WO | WO 2009/091563 | 7/2009 |
| WO | WO 2014/160342 | 10/2014 |
| WO | WO 2015134958 | 9/2015 |
| WO | WO 2016141373 | 9/2016 |
| WO | WO 2017096396 | 6/2017 |
| WO | WO 2017136833 | 8/2017 |
| WO | WO 9720244 | 12/2019 |
| WO | WO 2020/023383 | 1/2020 |

OTHER PUBLICATIONS

PCT International Search Report and Written Opinion for International Appln. No. PCT/US18/23011, Applicant Magic Leap, Inc. dated Jul. 23, 2018 (18 pages).
Response to Extended European Search Report dated May 13, 2019 for EP Application No. 16759643.6.
Reply brief filed May 6, 2019 for U.S. Appl. No. 15/062,104.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Final Office Action dated Jun. 21, 2019 for U.S. Appl. No. 15/369,646.
Non-Final Office Action for U.S. Appl. No. 14/641,376 dated Apr. 14, 2016.
Response to Non-Final office action filed Sep. 12, 2016 for U.S. Appl. No. 14/641,376.
Final Office Action for U.S. Appl. No. 14/641,376 dated Nov. 14, 2016.
Response to Final Office action filed Mar. 14, 2017 for U.S. Appl. No. 14/641,376.
PCT International Search Report and Written Opinion for International Appln. No. PCT/US15/19339, Applicant Magic Leap, Inc., Forms PCT/ISA/210, 220, and 237, dated Jun. 24, 2015 (10 pages).
PCT International Search Report and Written Opinion for International Appln. No. PCT/US16/21095, Applicant Magic Leap, Inc., forms PCT/ISA/210, 220, and 237, dated May 31, 2016 (12 pages).
PCT International Search Report and Written Opinion for International Appln. No. PCT/US16/65001, Applicant Magic Leap, Inc., forms PCT/ISA/210, 220, and 237, dated Feb. 16, 2017 (16 pages).
PCT International Search Report and Written Opinion for International Appln. No. PCT/US2017/016722, Applicant Magic Leap, Inc., forms PCT/ISA/210, 220, and 237, dated Apr. 14, 2017 (24 pages).
Notice of Allowance dated Aug. 14, 2017 for U.S. Appl. No. 14/641,376.
Preliminary Amendment filed Aug. 24, 2017 for U.S. Appl. No. 15/425,837.
Non-Final Office Action dated Dec. 6, 2017 for U.S. Appl. No. 15/062,104.
Voluntary Amendment for Canadian Appln. No. 2979560 filed Oct. 6, 2017, 24 pages.
Voluntary Amendment for Japanese Appln. No. 2017-546703 filed Nov. 7, 2017, 7 pages.
Response to Non-Final office action filed Mar. 6, 2018 for U.S. Appl. No. 15/062,104.
Final Office Action filed Apr. 30, 2018 for U.S. Appl. No. 15/062,104.
Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.
Non-Final Office Action dated Apr. 5, 2018 for U.S. Appl. No. 15/425,837.
Response to Non-Final Office Action filed Jul. 5, 2018 for U.S. Appl. No. 15/425,837.
Pre appeal brief filed Aug. 30, 2018 for U.S. Appl. No. 15/062,104.
Notice of Allowance dated Sep. 6 2018 for U.S. Appl. No. 15/425,837.
Extended European Search Report dated Oct. 16, 2018 for EP Application No. 16759643.6.
Amendment After Allowance dated Nov. 15, 2018 for U.S. Appl. No. 15/425,837.
Non final Office Action dated Nov. 29, 2018 for U.S. Appl. No. 15/369,646.
Extended European Search Report dated Jan. 7, 2019 for EP Application No. 16871733.8.
Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.
Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.
Bay Herbert et al.: SURF: Speeded Up Robust Features, International Conference on Simulation, Modeling and Programming for Autonomous Robots, Simpar 2010, Lecture Notes in Computer Science; Lect Notes Computer; May 7, 2006, pp. 404-417, XP047429677.
Alex Kendall et al.: PoseNet: A Convolutional Metwork for Real-Time 6-DOF Camera Relocalization,https://arxiv.org/pdf/1505.07427v3.pdf, Nov. 23, 2015; XP055536871.
Extended European Search Report dated Jan. 17, 2019 for EP Application No. 17748352.6.
Nair Rahul et al.: "A Survey on Time-of-Flight Stero Fusion", Oct. 9, 2015, Medical Image Computing and Computer Assisted Intervention Miccai 2015, 18th International Conference, Munich, Germany, Oct. 5-9, 2015; Proceedings; Lecture Notes in Computer Science; Lect Notes Computer; Springer International Publishing, CH, XP047148654.
Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
Amendment After Non-Final Office Action dated Feb. 28, 2019 for U.S. Appl. No. 15/369,646.
PCT International Search Report and Written Opinion for International Appln. No. PCT/US18/22884, Applicant Magic Leap, Inc., forms PCT/ISA/210, 220, and 237, dated May 21, 2018 (13 pages).
Non-Final Office Action for U.S. Appl. No. 15/923,560 dated Jan. 2, 2019.
Amendment Response to Non-Final Office Action for U.S. Appl. No. 15/923,560 dated Apr. 1, 2019.
PCT International Search Report and Written Opinion for International Appln. No. PCT/US18/22993, Applicant Magic Leap, Inc., forms PCT/ISA/210, 220, and 237, dated Jun. 8, 2018 (13 pages).
Response to Restriction Requirement filed Jul. 22, 2019 for U.S. Appl. No. 15/877,359.
Final Office Action for U.S. Appl. No. 15/923,560 dated Jul. 11, 2019.

(56) References Cited

OTHER PUBLICATIONS

Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017 (8 pages).
Response to Extended European Search Report dated Jul. 30, 2019 for European Application No. 16871733.8, (12 pages).
Response to Final Office Action and AFCP for U.S. Appl. No. 15/369,646 filed Aug. 21, 2019.
Response Non Final Office action filed Sep. 12, 2019 for U.S. Appl. No. 15/924,011.
Advisory Action dated Sep. 6, 2019 for U.S. Appl. No. 15/369,646.
RCE and Response to Final Office Action for U.S. Appl. No. 15/369,646 filed Sep. 19, 2019.
Office Action for Chinese Appln. No. 201680025479.1 dated Jul. 23, 2019, 16 pages w/English translation.
Response to Final Office Action for U.S. Appl. No. 15/923,560 filed Oct. 10, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Non-Final Office Action dated Oct. 30, 2019 for U.S. Appl. No. 16/220,617.
Non-Final Office Action dated Oct. 31, 2019 for U.S. Appl. No. 15/923,560.
Non Final Office Action dated Nov. 8, 2019 for U.S. Appl. No. 15/369,646.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335 filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrived electronically on Apr. 12, 2019 (5 pages).
Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments : Scalable algorithm for resolving incorrect occlusion", Computer-Aided Civil and Infrastructure Engineering, vol. 25, No. I, Jan. 1, 2010, pp. 3-19, XP55640847.
Breen D E et al: "Interactive occlusion 1-14 and automatic object placement for augmented reality", Computer Graphics Forum, Wiley-Blackwell Publishing LTD, GB, vol. 15, No. 3, Aug. 26, 1996, pp. 11-22, XP002515919.
Mark WR et al: "Post-Rendering 3D 1-14 Warping", Proceedings of 1997 Symposium on Interactive 3 D Graphics Apr. 27-30, 1997 Providence, RI, USA; ACM, New York, NY, USA, Apr. 27, 1997, pp. 7-16, XP000725355.
Amendment After Final Office Action for U.S. Appl. No. 15/924,011 dated Dec. 19, 2019.
Non-Final Office Action for U.S. Appl. No. 16/22,630 dated Dec. 26, 2019.
Extended European Search Report for European Appln. No. 18742228.2 dated Jan. 13, 2020 (8 pages).
Amendment After non-final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).
Amendment After non-final Office Action for U.S. Appl. No. 16/220,617 dated Jan. 30, 2020.
Amendment After non-final Office Action for U.S. Appl. No. 15/923,560 dated Jan. 31, 2020.
Response to Examination Report filed Feb. 11, 2020 for European Application No. 16759643.6.
Amendment After non-final Office Action for U.S. Appl. No. 15/369,646 dated Feb. 10, 2020.
Notice of Allowance for U.S. Appl. No. 16/220,617 dated Feb. 20, 2020.
Response to Office Action filed Feb. 20, 2020 for Israeli Patent Application No. 254300, (3 pages).
Foreign Office Action for Japanese Patent Appln. No. 2017-546703 dated Mar. 10, 2020.
Notice of Allowance for U.S. Appl. No. 15/369,646 dated Apr. 8, 2020.
Final Office Action for U.S. Appl. No. 15/877,359 dated Apr. 16, 2020.
Foreign Office Action for Israeli Patent Application No. 259766 dated Mar. 1, 2020.
Amendment After non-final Office Action for U.S. Appl. No. 16/220,630 dated Apr. 27, 2020.
1st Examination Report dated Jun. 24, 2020 for New Zealand Patent Application No. 743271.
Foreign Office Action for CN Patent Appln. No. 201680025479.1 dated Jun. 18, 2020.
Response to Extended European Search Report for European Appln. No. 18767086.4 filed Jun. 15, 2020 (84 pages).
Response to Extended European Search Report for European Appln. No. 18766694.6 filed Jun. 19, 2020 (78 pages).
1st Examiner's Report for AU European Patent Appln. No. 2016225963 dated Jul. 1, 2020.
Foreign Office Action Response for JP Patent Appln. No. 2017-546703 dated Jun. 1, 2020.
Non-Final Office Action for U.S. Appl. No. 16/848,496 dated May 18, 2020.
Notice of Allowance for U.S. Appl. No. 15/923,560 dated May 19, 2020.
Notice of Allowance for U.S. Appl. No. 16/220,630 dated Jun. 8, 2020.
Extended European Search Report dated Jun. 18, 2020 for EP Patent Application No. 18768030.1.
Mark, W., et al., "Post-Rendering 3D Warping", Proceedings of 1997 Symposium on 3D Graphics, Apr. 27-30, 1997, Providence, RI, USA, pp. 7-ff, XP058285072.
Amendment Response to Non-Final Office Action for U.S. Appl. No. 16/848,496 dated Jul. 22, 2020.

* cited by examiner

MIXED REALITY SYSTEM WITH COLOR VIRTUAL CONTENT WARPING AND METHOD OF GENERATING VIRTUAL CONTENT USING SAME

CROSS-REFERENCE TO RELATED APPLICATIONS

The present application claims the benefit of priority to U.S. Provisional Application Ser. No. 62/473,145, filed on Mar. 17, 2017, which is hereby incorporated by reference in its entirety.

FIELD OF THE INVENTION

The present disclosure relates to mixed reality systems with color virtual content warping, and methods for generating a mixed reality experience including warped virtual content using same.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems typically generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenarios in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems typically employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion. However, there is an inevitable lag between rendering a scene and displaying/projecting the rendered scene.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that if does not correspond to real physical objects located in respective positions in space. Instead, virtual content only exist in the brains (e.g., the optical centers) of a user of the head-worn display device when stimulated by light beams directed to the eyes of the user.

MR systems attempt to present color, photo-realistic, immersive MR scenarios. However, lag time between generation of virtual and display of the generated virtual content combined with head movement during the lag time can result in visual artifacts (e.g., glitches) in MR scenarios. This problem is exacerbated by rapid head movement during the lag time and with color content generated by sequentially projecting colors or fields (i.e., sequential displays such as LCOS).

In order to address this issue, some optical systems may include a warping software/system that receives source color virtual content from a source. The warping system then "warps" (i.e., transforms the frame of reference of) the received source color virtual content for display in a frame of reference of the display or output system/viewer (the "display or output frame of reference"). Warping or transforming changes the frame of reference from which color virtual content is presented. This approach takes the originally rendered color content, and shifts the way that the color content is presented to attempt to display the color content from a different perspective.

Some warping software/systems warp the source virtual content in two processing passes. Warping systems warp all of the source subparts forming a 3-D scenario in the source virtual content in a first pass. The warping systems also perform depth testing in this first pass to generate depth data, but the depth testing is performed in the source frame of reference. The warping systems store all the warped subparts resulting from the transformation of the source subparts forming the 3-D scenario and their relative depths in the source frame of reference in that first pass (e.g., in a list).

During warping, two or more different subparts of a 3-D scenario may warp/project into (i.e., be assigned to) the same pixel of a final display image. These subparts are "conflicting," and the warping system must resolve the conflict to generate a realistic 2-D display image.

After the first pass, some of the warped subparts may be conflicting relative to pixels of the final 2-D display image. The warping systems then perform a second pass through the intermediate warping data stored in the first pass to analyze the depth test data of conflicting warped subparts to identify the warped subparts closest to the viewing location in the output frame of reference. The conflicting warped subpart closest to the viewing location in the output frame of reference is used to generate a final 2-D display image. The remaining conflicting warped subparts are discarded.

Some warping software/systems warp color source virtual content using the same X, Y location in the output frame of reference for all colors/fields in the same color image. However, using one X, Y location in the output frame of reference to warp all (e.g., three) colors/fields ignores the close, but nonetheless different, times at which the different color sub-images are projected. This results in visual artifacts/anomalies/glitches that can detract from the immersiveness and realism of MR systems.

SUMMARY

In one embodiment, a computer implemented method for warping multi-field color virtual content for sequential projection includes obtaining first and second color fields having different first and second colors. The method also includes determining a first time for projection of a warped first color field. The method further includes determining a second time for projection of a warped second color field. Moreover, the method includes predicting a first pose at the first time and predicting a second pose at the second time. In addition, the method includes generating the warped first color field by warping the first color field based on the first pose. The method also includes generating the warped second color field by warping the second color field based on the second pose.

In one or more embodiments, the first color field includes first color field information at an X, Y location. The first color field information may include a first brightness in the first color. The second color field may include second image information at the X, Y location. The second color field information may include a second brightness in the second color.

In one or more embodiments, the warped first color field includes warped first color field information at a first warped X, Y location. The warped second color field may include warped second color field information at a second warped X, Y location. Warping the first color field based on the first pose may include applying a first transformation to the first color field to generate the warped first color field. Warping the second color field based on the second pose may include applying a second transformation to the second color field to generate the warped second color field.

In one or more embodiments, the method also includes sending the warped first and second color fields to a sequential projector, and the sequential projector sequentially projecting the warped first color field and the warped second color field. The warped first color field may be projected at the first time, and the warped second color field may be projected at the second time.

In another embodiment, a system for warping multi-field color virtual content for sequential projection includes a warping unit to receive first and second color fields having different first and second colors for sequential projection. The warping unit includes a pose estimator to determine first and second times for projection of respective warped first and second color fields, and to predict first and second poses at respective first and second times. The warping unit also includes a transform unit to generate the warped first and second color fields by warping respective first and second color fields based on respective first and second poses.

In still another embodiment, a computer program product is embodied in a non-transitory computer readable medium, the computer readable medium having stored thereon a sequence of instructions which, when executed by a processor causes the processor to execute a method for warping multi-field color virtual content for sequential projection. The method includes obtaining first and second color fields having different first and second colors. The method also includes determining a first time for projection of a warped first color field. The method further includes determining a second time for projection of a warped second color field. Moreover, the method includes predicting a first pose at the first time and predicting a second pose at the second time. In addition, the method includes generating the warped first color field by warping the first color field based on the first pose. The method also includes generating the warped second color field by warping the second color field based on the second pose.

In yet another embodiment, a computer implemented method for warping multi-field color virtual content for sequential projection includes obtaining an application frame and an application pose. The method also includes estimating a first pose for a first warp of the application frame at a first estimated display time. The method further includes performing a first warp of the application frame using the application pose and the estimated first pose to generate a first warped frame. Moreover, the method includes estimating a second pose for a second warp of the first warped frame at a second estimated display time. In addition, the method includes performing a second warp of the first warp frame using the estimated second pose to generate a second warped frame.

In one or more embodiments, the method includes displaying the second warped frame at about the second estimated display time. The method may also include estimating a third pose for a third warp of the first warped frame at a third estimated display time, and performing a third warp of the first warp frame using the estimated third pose to generate a third warped frame. The third estimated display time may be later than the second estimated display time. The method may also include displaying the third warped frame at about the third estimated display time.

In another embodiment, a computer implemented method for minimizing Color Break Up ("CBU") artifacts includes predicting a CBU artifact based on received eye or head tracking information, The method also includes increasing a color field rate based on the predicted CBU artifact.

In one or more embodiments, the method includes predicting a second CBU based on the received eye or head tracking information and the increased color field rate, and decreasing a bit depth based on the predicted second CBU artifact. The method may also include displaying an image using the increased color field rate and the decreased bit depth. The method may further include displaying an image using the increased color field rate.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Various embodiments of the disclosure are directed to systems, methods, and articles of manufacture for warping virtual content from him a source in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The virtual content warping systems may be implemented independently of mixed reality systems, but some embodiments below are described in relation to AR systems for illustrative purposes only. Further, the virtual content warping systems described herein may also be used in an identical manner with VR systems.

Illustrative Mixed Reality Scenario and System

The description that follows pertains to an illustrative augmented reality system with which the warping system may be practiced. However, it is to be understood that the embodiments also lends themselves to applications in other types of display systems (including other types of mixed reality systems), and therefore the embodiments are not to be limited to only the illustrative system disclosed herein.

Figure 1:
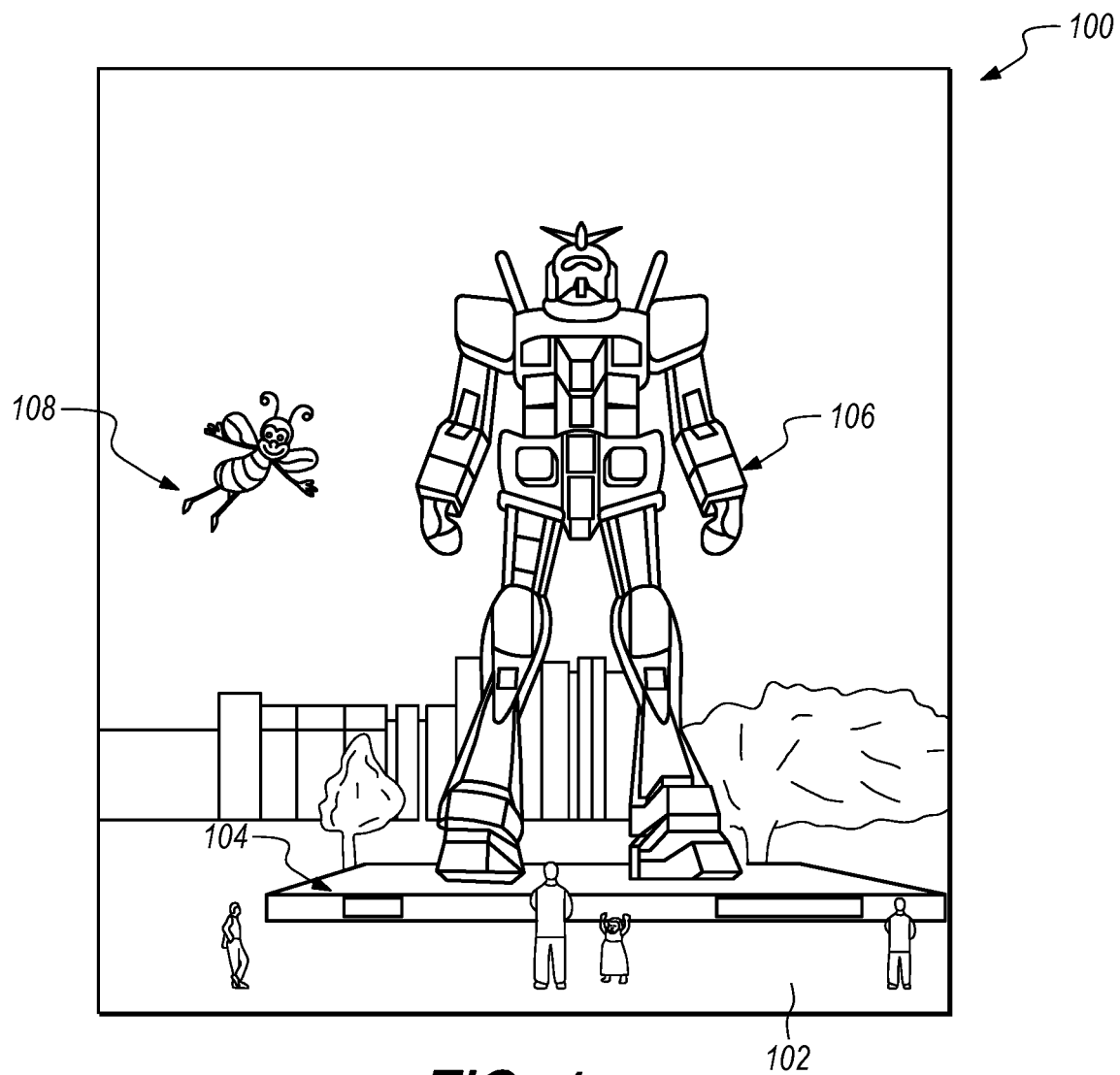
FIG. 1 depicts a user's view of augmented reality (AR) through a wearable AR user device, according to some embodiments.

Mixed reality (e.g., VR or AR) scenarios often include presentation of virtual content (e.g., color images and sound) corresponding to virtual objects in relationship to real-world objects. For example, referring to FIG. 1, an augmented reality (AR) scene 100 is depicted wherein a user of an AR technology sees a real-world, physical, park-like setting 102 featuring people, trees, buildings in the background, and a real-world, physical concrete platform 104. In addition to these items, the user of the AR technology also perceives that they "sees" a virtual robot statue 106 standing upon the physical concrete platform 104, and a virtual cartoon-like avatar character 108 flying by which seems to be a personification of a bumblebee, even though these virtual objects 106, 108 do not exist in the real-world.

Like AR scenarios, VR scenarios must also account for the poses used to generate/render the virtual content. Accurately warping the virtual content to the AR/VR display frame of reference and warping the warped virtual content can improve the AR/VR scenarios, or at least not detract from the AR/VR scenarios.

The description that follows pertains to an illustrative AR system with which the disclosure may be practiced. However, it is to be understood that the disclosure also lends itself to applications in other types of augmented reality and virtual reality systems, and therefore the disclosure is not to be limited to only the illustrative system disclosed herein.

Figure 2A:
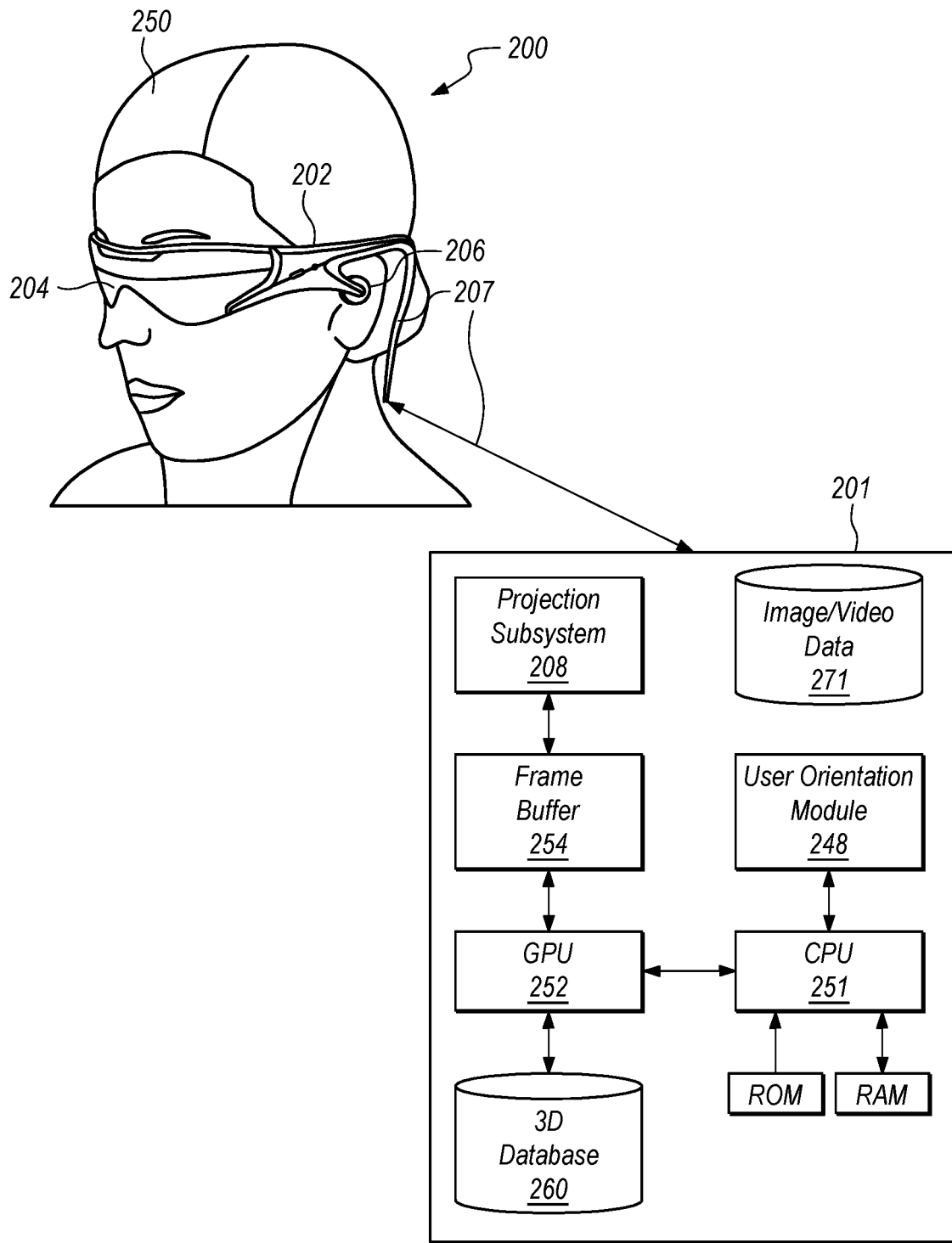
FIGS. 2A-2C schematically depict AR systems and subsystems thereof, according to some embodiments.

Referring to FIG. 2A, one embodiment of an AR system 200, according to some embodiments. The AR system 200 may be operated in conjunction with a projection subsystem 208, providing images of virtual objects intermixed with physical objects in a field of view of a user 250. This approach employs one or more at least partially transparent surfaces through which an ambient environment including the physical objects can be seen and through which the AR system 200 produces images of the virtual objects. The projection subsystem 208 is housed in a control subsystem 201 operatively coupled to a display system/subsystem 204 through a link 207. The link 207 may be a wired or wireless communication link.

For AR applications, it may be desirable to spatially position various virtual objects relative to respective physical objects in a field of view of the user 250. The virtual objects may take any of a large variety of forms, having any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The AR system 200 comprises a frame structure 202 worn by the user 250, the display system 204 carried by the frame structure 202, such that the display system 204 is positioned in front of the eyes of the user 250, and a speaker 206 incorporated into or connected to the display system 204. In the illustrated embodiment, the speaker 206 is carried by the frame structure 202, such that the speaker 206 is positioned adjacent (in or around) the ear canal of the user 250, e.g., an earbud or headphone.

The display system 204 is designed to present the eyes of the user 250 with photo-based radiation patterns that can be comfortably perceived as augmentations to the ambient environment including both two-dimensional and three-dimensional content. The display system 204 presents a sequence of frames at high frequency that provides the perception of a single coherent scene. To this end, the display system 204 includes the projection subsystem 208 and a partially transparent display screen through which the projection subsystem 208 projects images. The display screen is positioned in a field of view of the user 250 between the eyes of the user 250 and the ambient environment.

In some embodiments, the projection subsystem 208 takes the form of a scan-based projection device and the display screen takes the form of a waveguide-based display into which the scanned light from the projection subsystem 208 is injected to produce, for example, images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (e.g., one layer is within the cone of confusion of an adjacent layer). Additionally or alternatively, picture elements may be blended across two or more layers to increase perceived continuity of transition between layers in the light field, even if those layers are more sparsely stacked (e.g., one layer is outside the cone of confusion of an adjacent layer). The display system 204 may be monocular or binocular. The scanning assembly includes one or more light sources that produce the light beam (e.g., emits light of different colors in defined patterns). The light source may take any of a large variety of forms, for instance, a set of RGB sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. The optical coupling subsystem includes an optical waveguide input apparatus, such as for instance, one or more reflective surfaces, diffraction gratings, mirrors, dichroic mirrors, or prisms to optically couple light into the end of the display screen. The optical coupling subsystem further includes a collimation element that collimates light from the optical fiber. Optionally, the optical coupling subsystem includes an optical modulation apparatus configured for converging the light from the collimation element towards a focal point in the center of the optical waveguide input apparatus, thereby allowing the size of the optical waveguide input apparatus to be minimized. Thus, the display subsystem 204 generates a series of synthetic image frames of pixel information that present an undistorted image of one or more virtual objects to the user. The display subsystem 204 may also generate a series of color synthetic sub-image frames of pixel information that present an undistorted color image of one or more virtual objects to the user. Further details describing display subsystems are provided in U.S. Utility patent application Ser. No. 14/212,961, entitled "Display System and Method", and Ser. No. 14/331,218, entitled "Planar Waveguide Apparatus With Diffraction Element(s) and Subsystem Employing Same", the contents of which are hereby expressly and fully incorporated by reference in their entirety, as though set forth in full.

The AR system 200 further includes one or more sensors mounted to the frame structure 202 for detecting the position (including orientation) and movement of the head of the user 250 and/or the eye position and inter-ocular distance of the user 250. Such sensor(s) may include image capture devices, microphones, inertial measurement units (IMUs), accelerometers, compasses, GPS units, radio devices, gyros and the like. For example, in one embodiment, the AR system 200 includes a head worn transducer subsystem that includes one or more inertial transducers to capture inertial measures indicative of movement of the head of the user 250. Such devices may be used to sense, measure, or collect information about the head movements of the user 250. For instance, these devices may be used to detect/measure movements, speeds, acceleration and/or positions of the head of the user 250. The position (including orientation) of the head of the user 250 is also known as a "head pose" of the user 250.

The AR system 200 of FIG. 2A may include one or more forward facing cameras. The cameras may be employed for any number of purposes, such as recording of images/video from the forward direction of the system 200. In addition, the cameras may be used to capture information about the environment in which the user 250 is located, such as information indicative of distance, orientation, and/or angular position of the user 250 with respect to that environment and specific objects in that environment.

The AR system 200 may further include rearward facing cameras to track angular position (the direction in which the eye or eyes are pointing), blinking, and depth of focus (by detecting eye convergence) of the eyes of the user 250. Such eye tracking information may, for example, be discerned by projecting light at the end user's eyes, and detecting the return or reflection of at least some of that projected light.

The augmented reality system 200 further includes a control subsystem 201 that may take any of a large variety of forms. The control subsystem 201 includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem 201 may include a digital signal processor (DSP), a central processing unit (CPU) 251, a graphics processing unit (GPU) 252, and one or more frame buffers 254. The CPU 251 controls overall operation of the system, while the GPU 252 renders frames (i.e., translating a three-dimensional scene into a two-dimensional image) and stores these frames in the frame buffer(s) 254. While not illustrated, one or more additional integrated circuits may control the reading into and/or reading out of frames from the frame buffer(s) 254 and operation of the display system 204. Reading into and/or out of the frame buffer(s) 254 may employ dynamic addressing, for instance, where frames are over-rendered. The control subsystem 201 further includes a read only memory (ROM) and a random access memory (RAM). The control subsystem 201 further includes a three-dimensional database 260 from which the GPU 252 can access three-dimensional data of one or more scenes for rendering frames, as well as synthetic sound data associated with virtual sound sources contained within the three-dimensional scenes.

The augmented reality system 200 further includes a user orientation detection module 248. The user orientation module 248 detects the instantaneous position of the head of the user 250 and may predict the position of the head of the user 250 based on position data received from the sensor(s). The user orientation module 248 also tracks the eyes of the user 250, and in particular the direction and/or distance at which the user 250 is focused based on the tracking data received from the sensor(s).

Figure 2B:
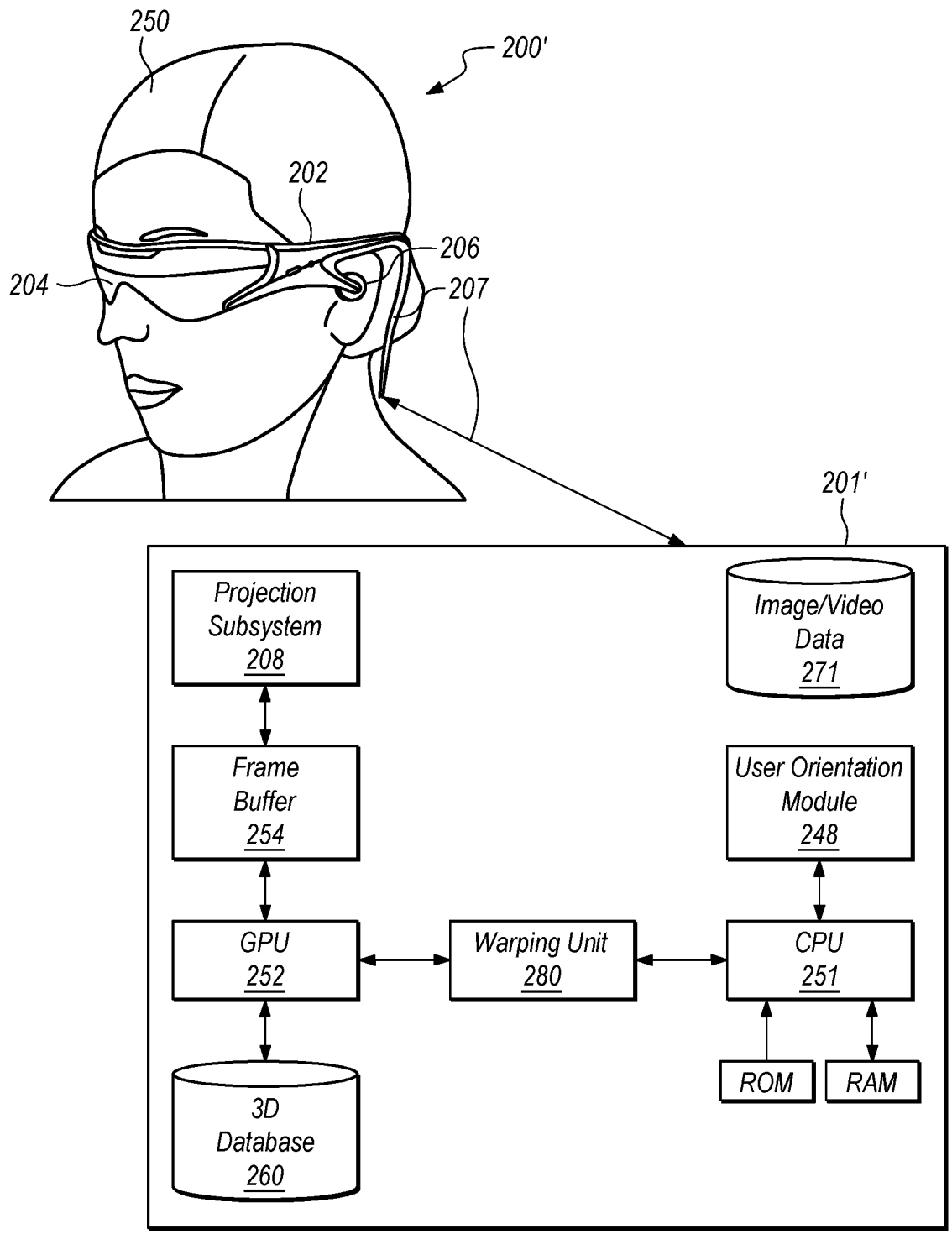

FIG. 2B depicts an AR system 200', according to some embodiments. The AR system 200' depicted in FIG. 2B is similar to the AR system 200 depicted in FIG. 2A and describe above. For instance, AR system 200' includes a frame structure 202, a display system 204, a speaker 206, and a control subsystem 201' operatively coupled to the display subsystem 204 through a link 207. The control subsystem 201' depicted in FIG. 2B is similar to the control subsystem 201 depicted in FIG. 2A and describe above. For instance, control subsystem 201' includes a projection subsystem 208, an image/video database 271, a user orientation module 248, a CPU 251, a GPU 252, a 3D database 260, ROM and RAM.

Figure 2C:
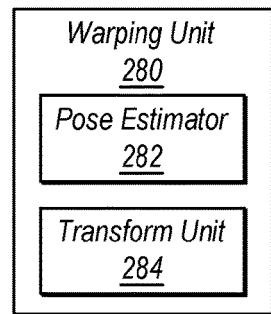

The difference between the control subsystem 201', and thus the AR system 200', depicted in FIG. 2B from the corresponding system/system component depicted in FIG. 2A, is the presence of warping unit 280 in the control subsystem 201' depicted in FIG. 2B. The warping unit 290 is a separate warping block that is independent from either the GPU 252 or the CPU 251. In other embodiments, warping unit 290 may be a component in a separate warping block. In some embodiments, the warping unit 290 may be inside the GPU 252. In some embodiments, the warping unit 290 may be inside the CPU 251. FIG. 2C shows that the warping unit 280 includes a pose estimator 282 and a transform unit 284.

The various processing components of the AR systems 200, 200' may be contained in a distributed subsystem. For example, the AR systems 200, 200' include a local processing and data module (i.e., the control subsystem 201, 201') operatively coupled, such as by a wired lead or wireless connectivity 207, to a portion of the display system 204. The local processing and data module may be mounted in a variety of configurations, such as fixedly attached to the frame structure 202, fixedly attached to a helmet or hat, embedded in headphones, removably attached to the torso of the user 250, or removably attached to the hip of the user 250 in a belt-coupling style configuration. The AR systems 200, 200' may further include a remote processing module and remote data repository operatively coupled, such as by a wired lead or wireless connectivity to the local processing and data module, such that these remote modules are operatively coupled to each other and available as resources to the local processing and data module. The local processing and data module may include a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display system 204 after such processing or retrieval. The remote processing module may comprise one or more relatively powerful processors or controllers configured to analyze and process data and/or image information. The remote data repository may comprise a relatively large-scale digital data storage facility, which may be available through the internet or other networking configuration in a "cloud" resource configuration. In some embodiments, all data is stored and all computation is performed in the local processing and data module, allowing fully autonomous use from any remote modules. The couplings between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s).

Summary of Problems and Solutions

Figure 3:
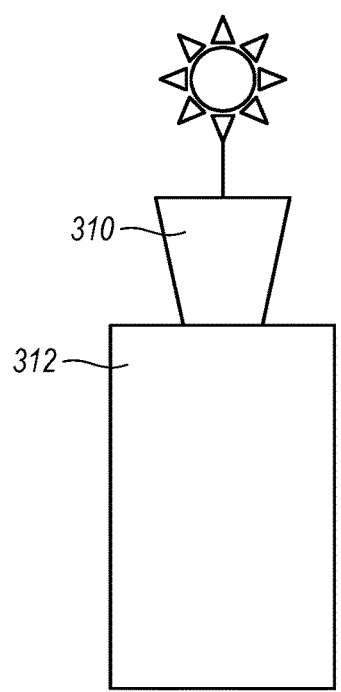
FIGS. 3 and 4 illustrate a rendering artifact with rapid head movement, according to some embodiments.

When an optical system generates/renders color virtual content, it may use a source frame of reference that may be related to a pose of the system when the virtual content is rendered. In AR systems, the rendered virtual content may have a predefined relationship with a real physical object. For instance, FIG. 3 illustrates an AR scenario 300 including a virtual flower pot 310 positioned on top of a real physical pedestal 312. An AR system rendered the virtual flower pot 310 based on a source frame of references in which the location of a real pedestal 312 is known such that the virtual flower pot 310 appears to be resting on top of the real pedestal 312. The AR system may, at a first time, render the virtual flower pot 310 using a source frame of reference, and, at a second time after the first time, display/project the rendered virtual flower pot 310 at an output frame of reference. If the source frame of reference and the output frame of reference are the same, the virtual flower pot 310 will appear where it is intended to be (e.g., on top of the real physical pedestal 312).

Figure 4:
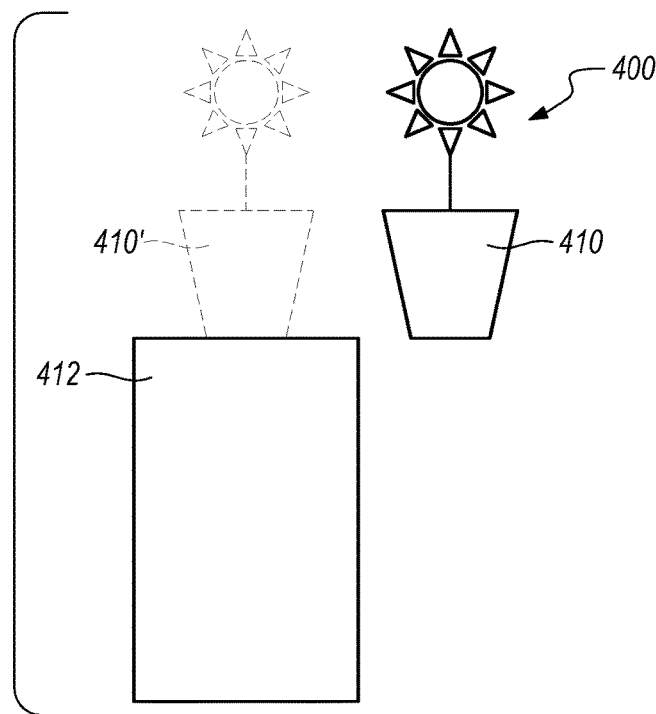

However, if the AR system's frame of reference changes (e.g., with rapid user head movement) in a gap between the first time at which the virtual flower pot 310 is rendered and the second time at which the rendered virtual flower pot 310 is displayed/projected, the mismatch/difference between the source frame of reference and the output frame of reference may result in visual artifacts/anomalies/glitches. For instance, FIG. 4 shows an AR scenario 400 including a virtual flower pot 410 that was rendered to be positioned on top of a real physical pedestal 412. However, because the AR system was rapidly moved to the right after the virtual flower pot 410 was rendered but before it was displayed/projected, the virtual flower pot 410 is displayed to the right of its intended position 410' (shown in phantom). As such, the virtual flower pot 410 appears to be floating in midair to the right of the real physical pedestal 412. This artifact will be remedied when the virtual flower pot is re-rendered in the output frame of reference (assuming that the AR system motion ceases). However, the artifact will still be visible to some users with the virtual flower pot 410 appearing to glitch by temporarily jumping to an unexpected position. This glitch and others like it can have a deleterious effect on the illusion of continuity of an AR scenario.

Some optical systems may include a warping system that warps or transforms the frame of reference of source virtual content from the source frame of reference in which the virtual content was generated to the output frame of reference in which the virtual content will be displayed. In the example depicted in FIG. 4, the AR system can detect and/or predict (e.g., using IMUs or eye tracking) the output frame of reference and/or pose. The AR system can then warp or transform the rendered virtual content from the source frame of reference into warped virtual content in the output frame of reference.

Color Virtual Content Warping Systems and Methods

Figure 5:
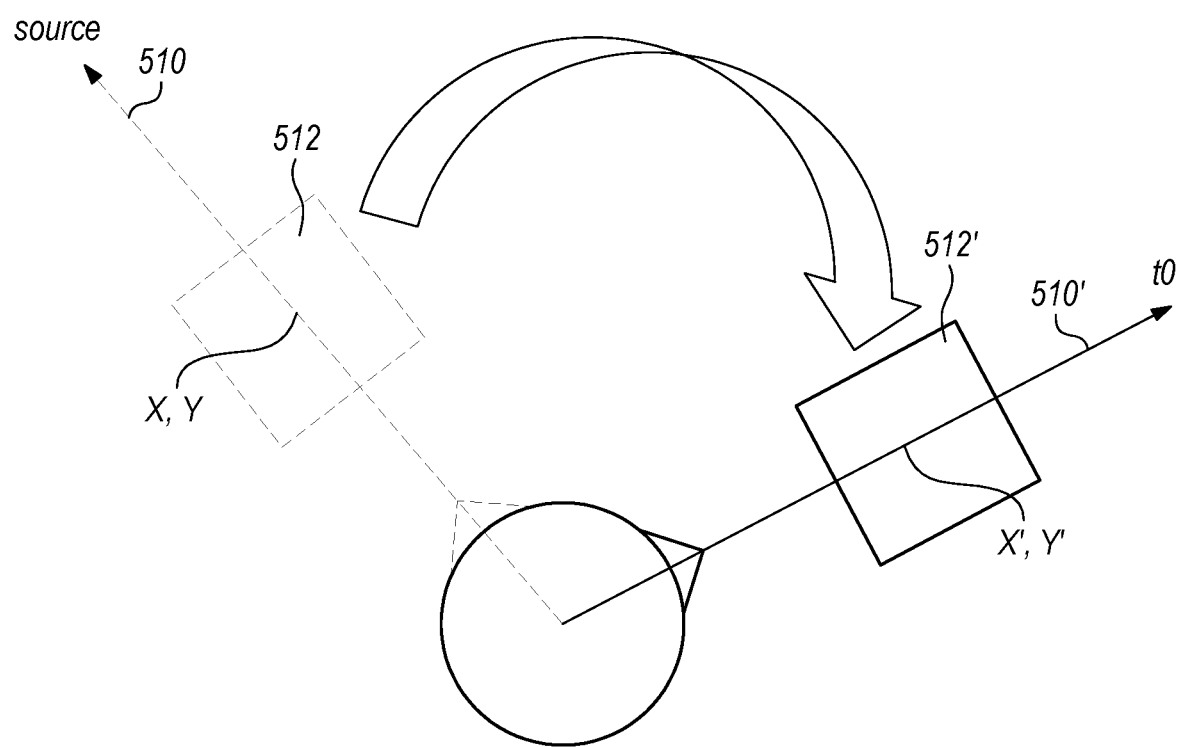
FIG. 5 illustrates an exemplary virtual content warp, according to some embodiments.

FIG. 5 schematically illustrates warping of virtual content, according to some embodiments. Source virtual content 512 in a source frame of reference (render pose) represented by ray 510, is warped into warped virtual content 512' in an output frame of reference (estimated pose) represented by ray 510'. The warp depicted in FIG. 5 may represent a head rotation to the right. While the source virtual content 512 is disposed at source X, Y location, the warped virtual content 512' is transformed to output X', Y' location.

Figure 6:
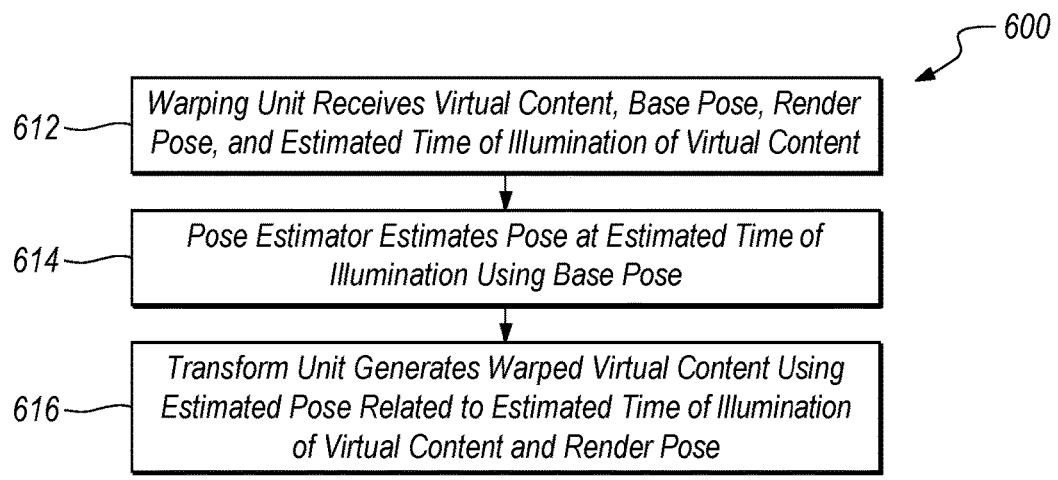
FIG. 6 depicts a method of warping virtual content as illustrated in FIG. 5, according to some embodiments.

FIG. 6 depicts a method of warping virtual content, according to some embodiments. At step 612, the warping unit 280 receives virtual content, a base pose (i.e., a current pose (current frame of reference) of the AR system 200, 200'), a render pose (i.e., a pose of the AR system 200, 200' used to render the virtual content (source frame of reference)), and an estimated time of illumination (i.e., estimated time at which the display system 204 will be illuminated (estimated output frame of reference)). In some embodiments, the base pose may be newer/more recent/more up-to-date than the render pose. At step 614, a pose estimator 282 estimates a pose at estimated time of illumination using the base pose and information about the AR system 200, 200'. At step 616, a transform unit 284 generates warped virtual content from the received virtual content using the estimated pose (from the estimated time of illumination) and the render pose.

When the virtual content includes color, some warping systems warp all of color sub-images or fields corresponding to/forming a color image using a single X', Y' location in a single output frame of reference (e.g., a single estimated pose from a single estimated time of illumination). However, some projection display systems (e.g., sequential projection display systems), like those in some AR systems, do not project all of the color sub-images/fields at the same time. For example, there may be some lag between projection of each color sub-image/fields. This lag between the projection of each color sub-images/fields, that is the difference in time of illumination, may result in color fringing artifacts in the final image during rapid head movement.

Figure 7A:
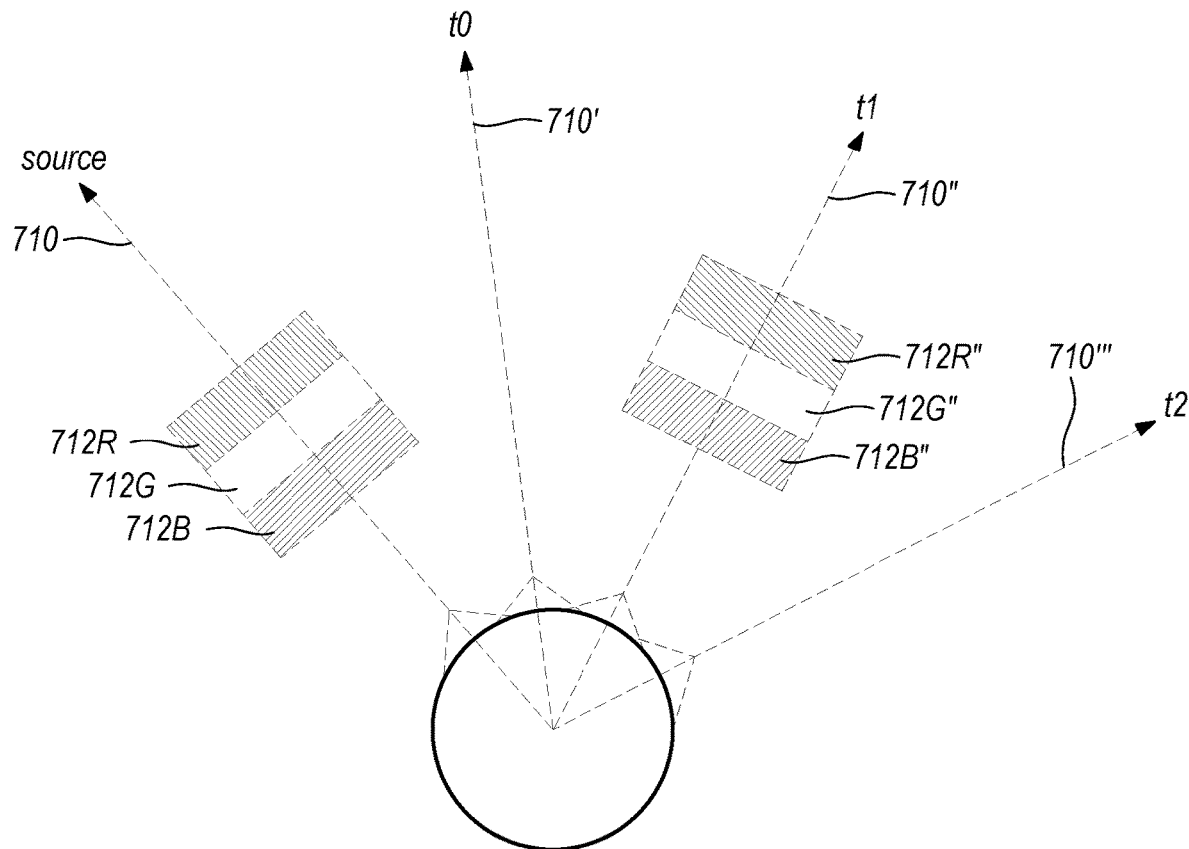
FIGS. 7A and 7B depict a multi-field (color) virtual content warp and the result thereof, according to some embodiments.

For instance, FIG. 7A schematically illustrates the warping of color virtual content using some warping systems, according to some embodiments. The source virtual content 712 has three color sections: a red section 712R; a green section 712G; and a blue section 712B. In this example, each color section corresponds to a color sub-image/field 712R", 712G", 712B". Some warping systems use a single output frame of reference (e.g., estimate pose) represented by ray 710" (e.g., the frame of reference 710" corresponding to the green sub-image and its time of illumination t1) to warp all three color sub-images 712R", 712G", 712B". However, some projection systems do not project the color sub-images 712R", 712G", 712B" at the same time. Instead, the color sub-images 712R", 712G", 712B" are projected at three slightly different times (represented by rays 710', 710", 710''' at times t0, t1, and t2). The size of the lag between projection of sub-images may depend on a frame/refresh rate of the projection system. For example, if the projection system has a frame rate of 60 Hz or below (e.g., 30 Hz), the lag can result in color fringing artifacts with fast moving viewers or objects.

Figure 7B:
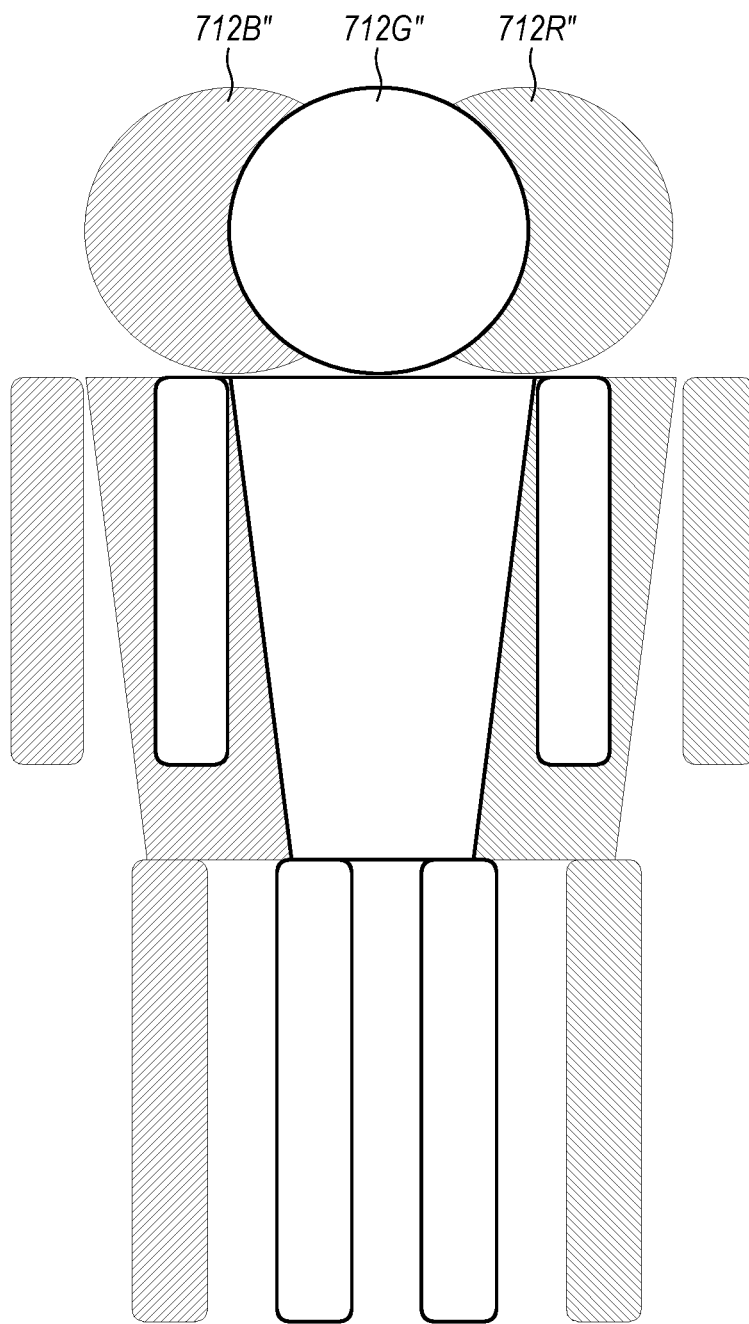

FIG. 7B illustrates color fringing artifacts generated by a virtual content warping system/method similar to the one depicted in FIG. 7A, according to some embodiments. Because the red sub-image 712R" is warped using the output frame of reference (e.g., estimate pose) represented by ray 710" in FIG. 7A, but projected at time t0 represented by ray 710', the red sub-image 712R" appears to overshoot the intended warp. This overshoot manifests as a right fringe image 712R" in FIG. 7B. Because the green sub-image 712G" is warped using the output frame of reference (e.g., estimated pose) represented by ray 710" in FIG. 7A, and projected at time t1 represented by ray 710", the green sub-image 712G" is projected with the intended warp. This is represented by the center image 712G" in FIG. 7B. Because the blue sub-image 712B" is warped using the output frame of reference (e.g., estimated pose) represented by ray 710" in FIG. 7A, but projected at time t2 represented by ray 710''', the blue sub-image 712B" appears to undershoot the intended warp. This undershoot manifests as a left fringe image 712B" in FIG. 7B. FIG. 7B illustrates the reconstruction of warped virtual content including a body having three overlapping R, G, B color fields (i.e., a body rendered in color) in a user's mind. FIG. 7B includes a red right fringe image color break up ("CBU") artifact 712R", a center image 712G", and a blue left fringe image CBU artifact 712B".

FIG. 7B exaggerates the overshoot and undershoot effects for illustrative purposes. The size of these effects depends on the frame/field rate of the projection system and the relative speeds of the virtual content and the output frame of reference (e.g., estimated pose). When these overshoot and undershoot effects are smaller, they may appear as color/rainbow fringes. For example, at slow enough frame rates, a white virtual object, such as a baseball, may have color (e.g., red, green, and/or blue) fringes. Instead of having a fringe, virtual objects with select solid colors matching a sub-image (e.g., red, green, and/or blue) may glitch (i.e., appear to jump to an unexpected position during rapid movement and jump back to an expected position after rapid movement). Such solid color virtual objects may also appear to vibrate during rapid movement.

Figure 8:
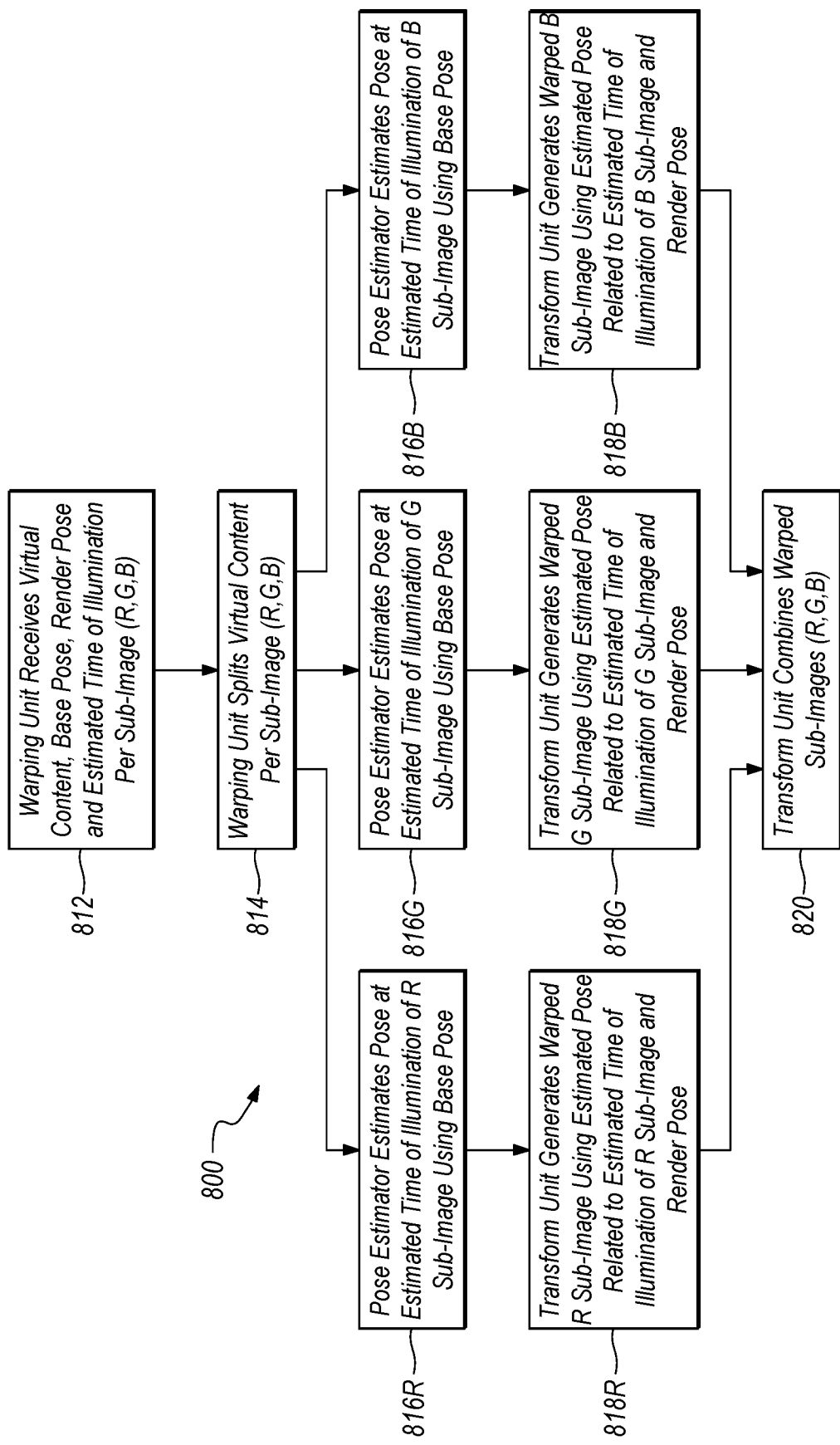
FIG. 8 depicts a method of warping multi-field (color) virtual content, according to some embodiments.

In order to address these limitations and others, the systems described herein warp color virtual content using a number of frames of reference corresponding to the number of color sub-images/fields. For example, FIG. 8 depicts a method of warping coloring virtual content, according to some embodiment. At step 812, a warping unit 280 receives virtual content, a base pose (i.e., a current pose (current frame of reference) of the AR system 200, 200'), a render pose (i.e., a pose of the AR system 200, 200' used to render the virtual content (source frame of reference)), and estimated times of illumination per sub-image/color field (R, G, B) (i.e., estimated time at which the display system 204 be illuminated for each sub-image (estimated output frame of reference of each sub-image)) related to the display system 204. At step 814, the warping unit 280 splits the virtual content into each sub-image/color field (R, G, B).

At steps 816R, 816G, and 816B, a pose estimator 282 estimates a pose at respective estimated times of illumination for R, G, B sub-images/fields using the base pose (e.g., current frame of reference) and information about the AR system 200, 200'. At steps 818R, 818G, and 818B, a transform unit 284 generates R, G, and B warped virtual content from the received virtual content sub-image/color field (R, G, B) using respective estimated R, G, and B poses and the render pose (e.g., source frame of reference). At step 820, the transform unit 284 combines the warped R, G, B sub-images/fields for sequential display.

Figure 9A:
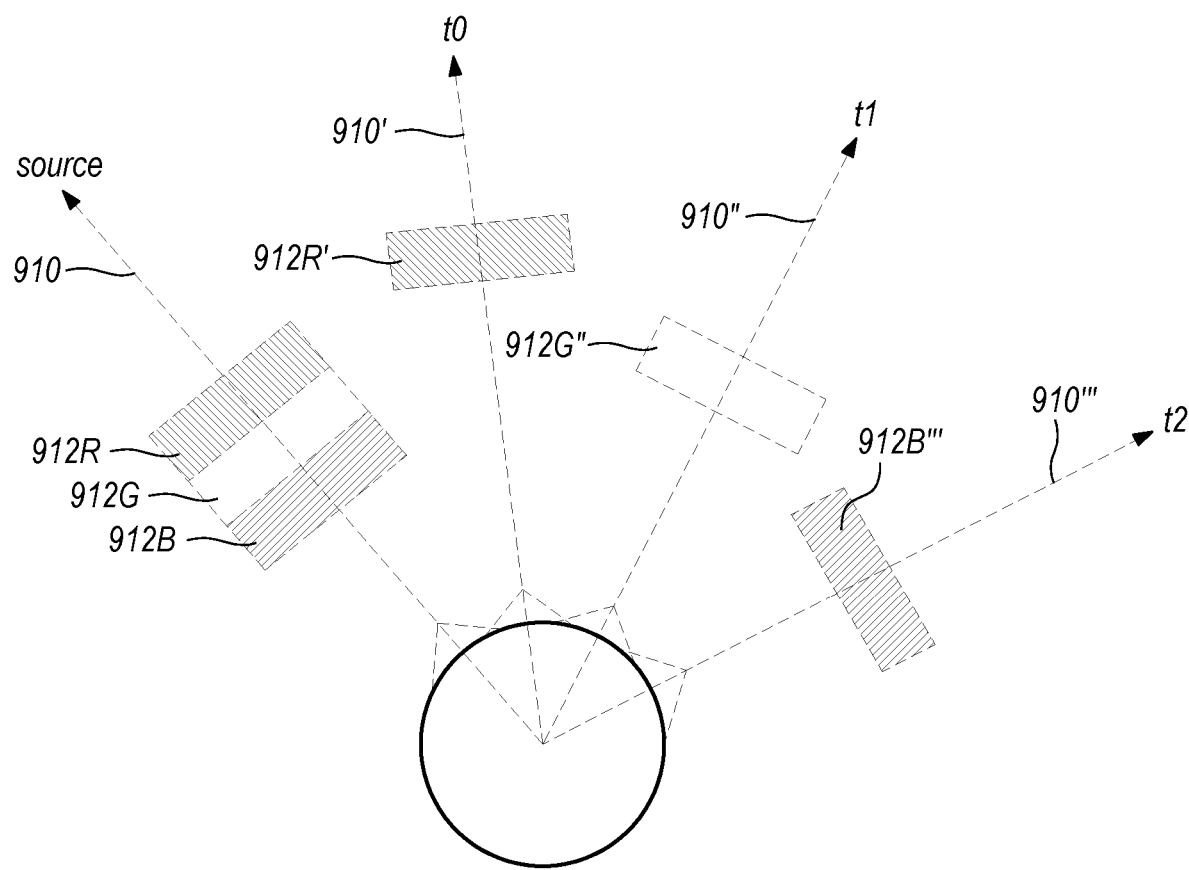
FIGS. 9A and 9B depict a multi-field (color) virtual content warp and the result thereof, according to some embodiments.

FIG. 9A schematically illustrates the warping of color virtual content using warping systems, according to some embodiments. Source virtual content 912 is identical to the source virtual content 712 in FIG. 7A. The source virtual content 912 has three color sections: a red section 912R; a green section 912G; and a blue section 912B. Each color section corresponds to a color sub-image/field 912R', 912G", 912B'". Warping systems according to the embodiments herein use respective output frames of reference (e.g., estimated poses) represented by rays 910', 910", 910'" to warp each corresponding color sub-image/field 912R', 912G", 912B'". These warping systems take the timing (i.e., t0, t1, t2) of projection of the color sub-images 912R', 912G", 912B'" into account when warping color virtual content. The timing of projection depends on the frame/field rate of the projection systems, which is used to calculate the timing of projection.

Figure 9B:
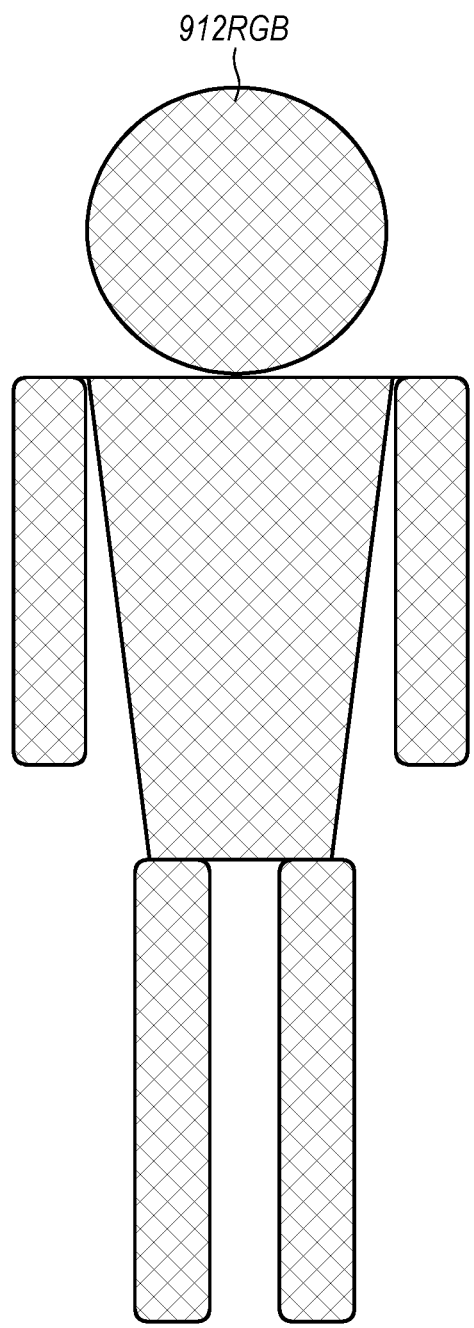

FIG. 9B illustrates a warped color sub-images 912R', 912G", 912B'" generated by the virtual content warping system/method similar to the one depicted in FIG. 9A. Because the red, green, and blue sub-images 912R', 912G", 912B'" are warped using respective output frames of reference (e.g., estimated poses) represented by rays 910', 910", 910'" and projected at times t0, t1, t2 represented by the same rays 910', 910", 910'", the sub-images 912R', 912G", 912B'" are projected with the intended warp. FIG. 9B illustrates the reconstruction of the warped virtual content according to some embodiments including a body having three overlapping R, G, B color fields (i.e., a body rendered in color) in a user's mind. FIG. 9B is a substantially accurate rendering of the body in color because the three sub-images/fields 912R', 912G", 912B'" are projected with the intended warp at the appropriate times.

The warping systems according to the embodiments herein warp the sub-images/fields 912R', 912G", 912B'" using the corresponding frames of reference (e.g. estimated poses) that take into account the timing of projection/time of illumination, instead of using a single frame of reference. Consequently, the warping systems according to the embodiments herein warp color virtual content into separate sub-images of different colors/fields while minimizing warp related color artifacts such as CBU. More accurate warping of color virtual content contributes to more realistic and believable AR scenarios.

Illustrative Graphics Processing Unit

Figure 10:
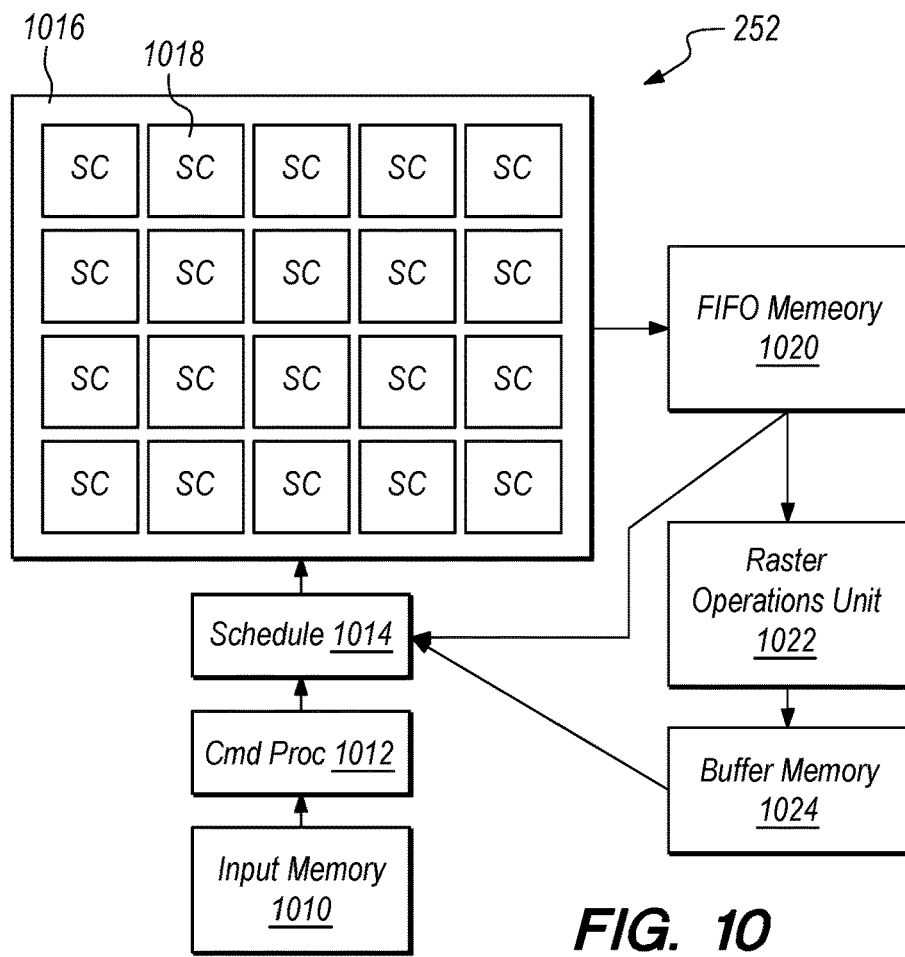
FIG. 10 schematically depicts a graphics processing unit (GPU), according to some embodiments.
Figure 11:
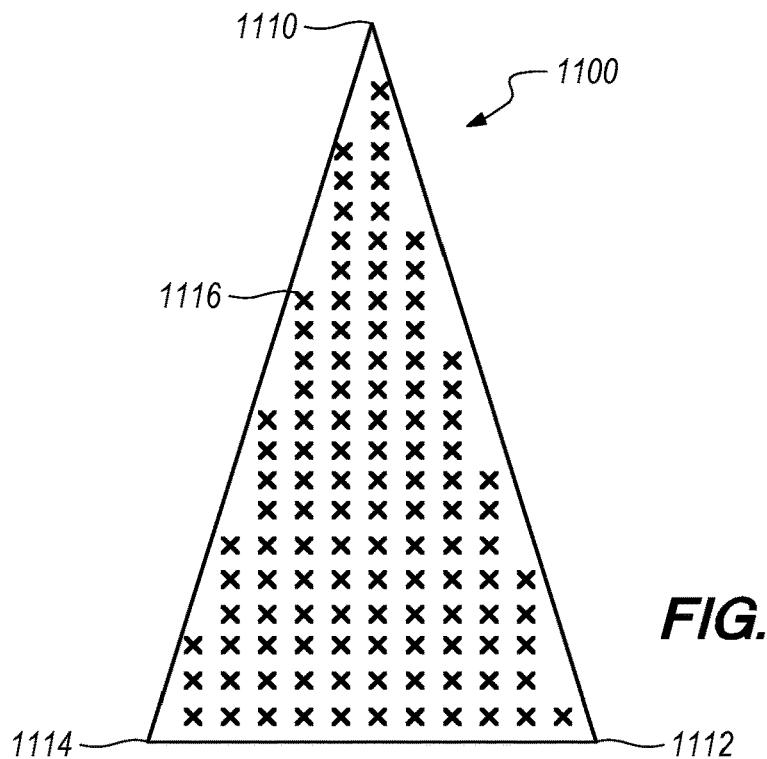
FIG. 11 depicts a virtual object stored as a primitive, according to some embodiments.

FIG. 10 schematically depicts an exemplary graphics processing unit (GPU) 252 to warp color virtual content to output frames of reference corresponding to various color sub-images or fields, according to one embodiment. The GPU 252 includes an input memory 1010 to store the generated color virtual content to be warped. In one embodiment, the color virtual content is stored as a primitive (e.g., a triangle 1100 in FIG. 11). The GPU 252 also includes a command processor 1012, which (1) receives/reads the color virtual content from input memory 1010, (2) divides the color virtual content into color sub-images and those color sub-images into scheduling units, and (3) sends the scheduling units along the rendering pipeline in waves or warps for parallel processing. The GPU 252 further includes a scheduler 1014 to receive the scheduling units from the command processor 1012. The scheduler 1014 also determines whether the "new work" from the command processor 1012 or "old work" returning from downstream in the rendering pipeline (described below) should be sent down the rendering pipeline at any particular time. In effect, the scheduler 1014 determines the sequence in which the GPU 252 processes various input data.

The GPU 252 includes a GPU core 1016, which has a number of parallel executable cores/units ("shader cores") 1018 for processing the scheduling units in parallel. The command processor 1012 divides the color virtual content into a number equal to the number of shader cores 1018 (e.g., 32). The GPU 252 also includes a "First In First Out" ("FIFO") memory 1020 to receive output from the GPU core 1016. From the FIFO memory 1020, the output may be routed back to the scheduler 1014 as "old work" for insertion into the rendering pipeline additional processing by the GPU core 1016.

The GPU 252 further includes a Raster Operations Unit ("ROP") 1022 that receives output from the FIFO memory 1020 and rasterizes the output for display. For instance, the primitives of the color virtual content may be stored as the coordinates of the vertices of triangles. After processing by the GPU core 1016 (during which the three vertices 1110, 1112, 1114 of a triangle 1100 may be warped), the ROP 1022 determines which pixels 1116 are inside of the triangle 1100 defined by three vertices 1110, 1112, 1114 and fills in those pixels 1116 in the color virtual content. The ROP 1022 may also perform depth testing on the color virtual content. For processing of color virtual content, the GPU 252 may include a plurality of ROPs 1022R, 1022B, 1022G for parallel processing of sub-images of different primary colors.

The GPU 252 also includes a buffer memory 1024 for temporarily storing warped color virtual content from the ROP 1022. The warped color virtual content in the buffer memory 1024 may include brightness/color and depth information at a plurality of X, Y positions in a field of view in an output frame of reference. The output from the buffer memory 1024 may be routed back to the scheduler 1014 as "old work" for insertion into the rendering pipeline additional processing by the GPU core 1016, or for display in the corresponding pixels of the display system. Each fragment of color virtual content in the input memory 1010 is processed by the GPU core 1016 at least twice. The GPU cores 1016 first processes the vertices 1110, 1112, 1114 of the triangles 1100, then it processes the pixels 1116 inside of the triangles 1100. When all the fragments of color virtual content in the input memory 1010 have been warped and depth tested (if necessary), the buffer memory 1024 will include all of the brightness/color and depth information needed to display a field of view in an output frame of reference.

Color Virtual Content Warping Systems and Methods

In standard image processing without head pose changes, the results of the processing by the GPU 252 are color/brightness values and depth values at respective X, Y values (e.g., at each pixel). However with head pose changes, virtual content is warped to conform to the head pose changes. With color virtual content, each color sub-image is warped separately. In existing methods for warping color virtual content, color sub-images corresponding to a color image are warped using a single output frame of reference (e.g., corresponding to the green sub-image). As described above, this may result in color fringing and other visual artifacts such as CBU.

Figure 12:
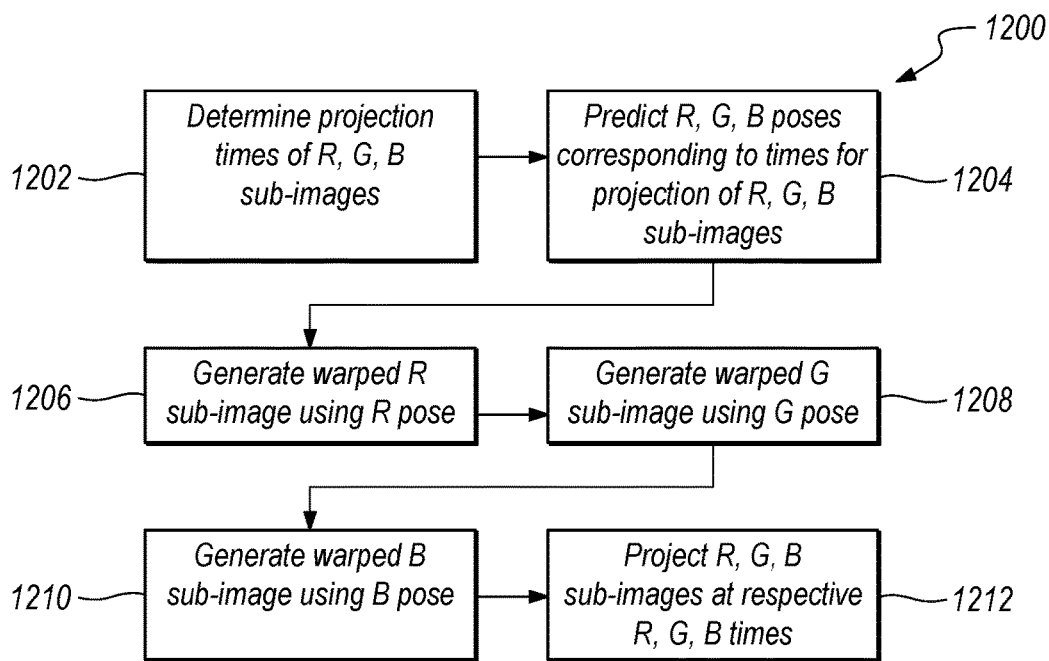
FIG. 12 depicts a method of warping multi-field (color) virtual content, according to some embodiments.

FIG. 12 depicts a method 1200 for warping color virtual content while minimizing visual artifacts such as CBU. At step 1202, a warping system (e.g., a GPU core 1016 and/or a warping unit 280 thereof) determines the projection/illumination times for the R, G, and B sub-images. This determination uses the frame rate and other characteristics of a related projection system. In the example in FIG. 9A, the projection times correspond to t0, t1, and t2 and rays 910', 910", 910'''.

At step 1204, the warping system (e.g., the GPU core 1016 and/or the pose estimator 282 thereof) predicts poses/frames of reference corresponding to the projection times for the R, G, and B sub-images. This prediction uses various system input including current pose, system IMU velocity, and system IMU acceleration. In the example in FIG. 9A, the R, G, B poses/frames of reference correspond to rays t0, t1, and t2 and 910', 910", 910'''.

At step 1206, the warping system (e.g., the GPU core 1016, the ROP 1022, and/or the transformation unit 284 thereof) warps the R sub-image using the R pose/frame of reference predicted at step 1204. At step 1208, the warping system (e.g., the GPU core 1016, the ROP 1022, and/or the transformation unit 284 thereof) warps the G sub-image using the G pose/frame of reference predicted at step 1204. At step 1210, the warping system (e.g., the GPU core 1016, the ROP 1022, and/or the transformation unit 284 thereof) warps the B sub-image using the B pose/frame of reference predicted at step 1204. Warping the separate sub-images/fields using the respective poses/frames of reference distinguishes these embodiments from existing methods for warping color virtual content.

At step 1212, a projection system operatively coupled to the warping system projects the R, G, B sub-images at the projection times for the R, G, and B sub-images determined in step 1202.

As described above, the method 1000 depicted in FIG. 10 may also be executed on a separate warping unit 290 that is independent from either any GPU 252 or CPU 251. In still another embodiment, the method 1000 depicted in FIG. 10 may be executed on a CPU 251. In yet other embodiments, the method 1000 depicted in FIG. 10 may be executed on various combinations/sub-combinations of GPU 252, CPU 251, and separate warping unit 290. The method 1000 depicted in FIG. 10 is an image processing pipeline that can be executed using various execution models according to system resource availability at a particular time.

Warping color virtual content using predicted poses/frames of reference corresponding to each color sub-image/field reduces color fringe and other visual anomalies. Reducing these anomalies results in a more realistic and immersive mixed reality scenario.

System Architecture Overview

Figure 13:
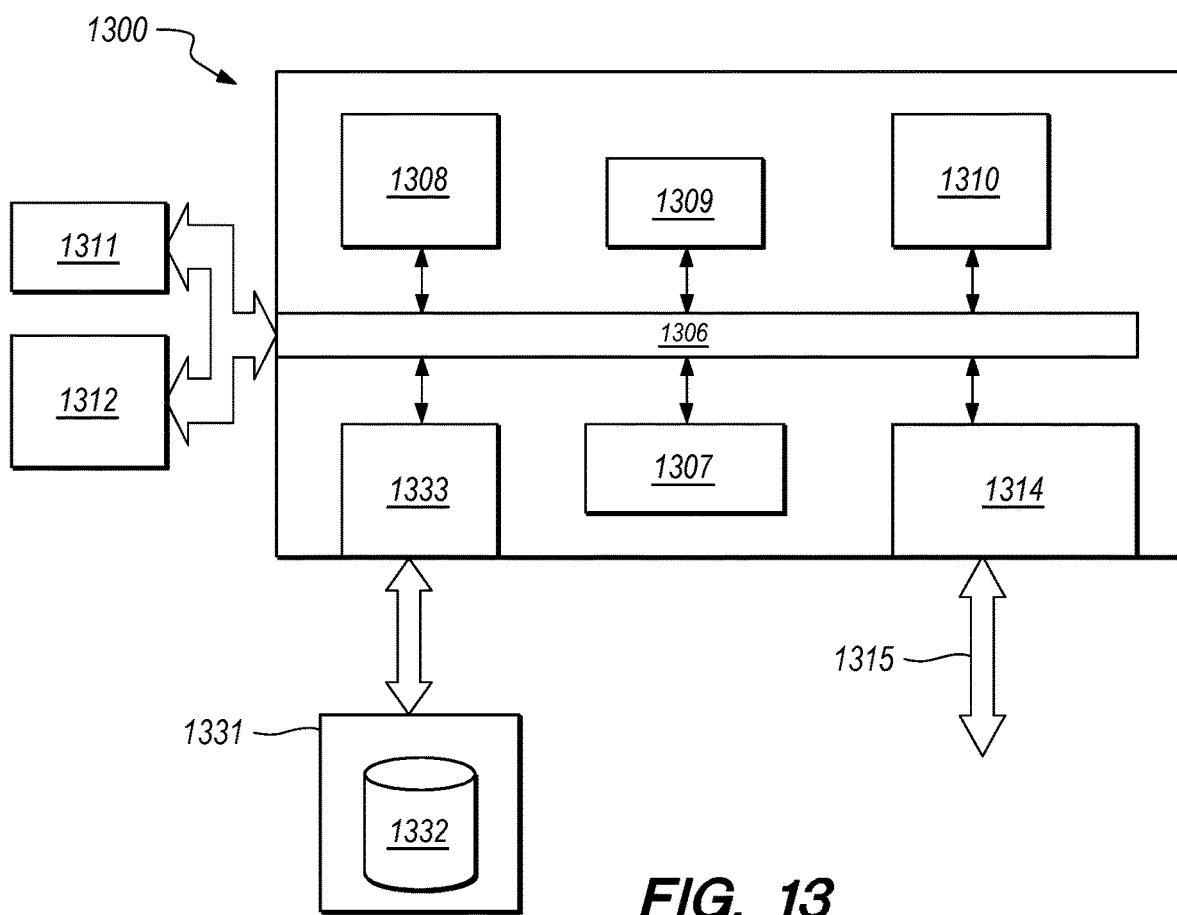
FIG. 13 is a block diagram schematically depicting an illustrative computing system, according to some embodiments.

FIG. 13 is a block diagram of an illustrative computing system 1300, according to some embodiments. Computer system 1300 includes a bus 1306 or other communication mechanism for communicating information, which interconnects subsystems and devices, such as processor 1307, system memory 1308 (e.g., RAM), static storage device 1309 (e.g., ROM), disk drive 1310 (e.g., magnetic or optical), communication interface 1314 (e.g., modem or Ethernet card), display 1311 (e.g., CRT or LCD), input device 1312 (e.g., keyboard), and cursor control.

According to some embodiments, computer system 1300 performs specific operations by processor 1307 executing one or more sequences of one or more instructions contained in system memory 1308. Such instructions may be read into system memory 1308 from another computer readable/usable medium, such as static storage device 1309 or disk drive 1310. In alternative embodiments, hard-wired circuitry may be used in place of or in combination with software instructions to implement the disclosure. Thus, embodiments are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1307 for execution. Such a medium may take many forms, including but not limited to, non-volatile media and volatile media. Non-volatile media includes, for example, optical or magnetic disks, such as disk drive 1310. Volatile media includes dynamic memory, such as system memory 1308.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In some embodiments, execution of the sequences of instructions to practice the disclosure is performed by a single computer system 1300. According to some embodiments, two or more computer systems 1300 coupled by communication link 1315 (e.g., LAN, PTSN, or wireless network) may perform the sequence of instructions required to practice the disclosure in coordination with one another.

Computer system 1300 may transmit and receive messages, data, and instructions, including program, i.e., application code, through communication link 1315 and communication interface 1314. Received program code may be executed by processor 1307 as it is received, and/or stored in disk drive 1310, or other non-volatile storage for later execution. Database 1332 in storage medium 1331 may be used to store data accessible by system 1300 via data interface 1333.

Alternative Warp/Render Pipeline

Figure 14:
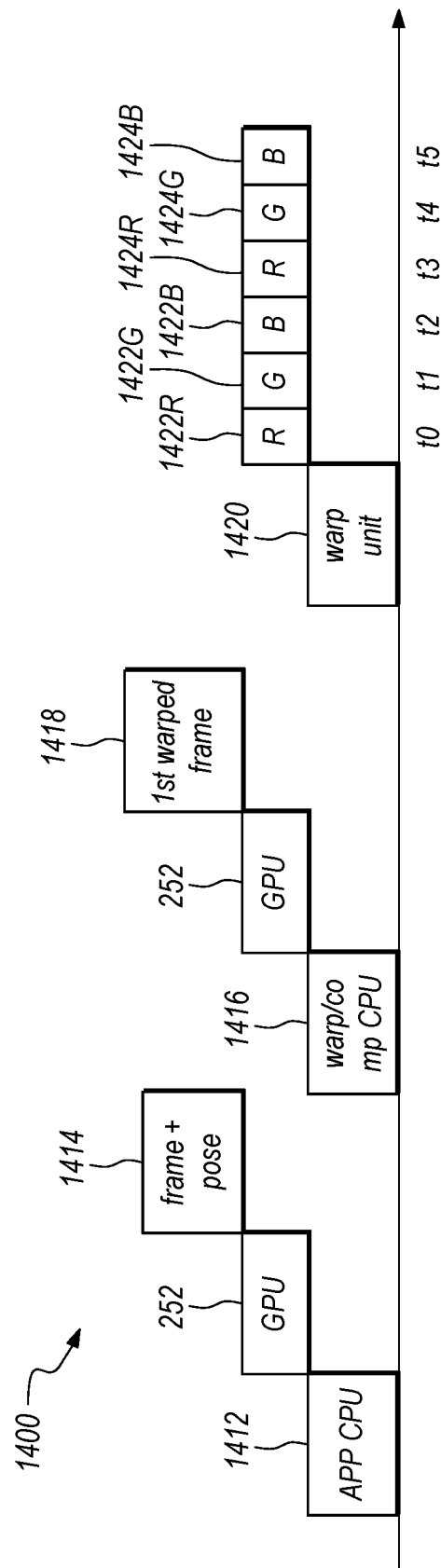
FIG. 14 depicts a warp/render pipeline for multi-field (color) virtual content, according to some embodiments.

FIG. 14 depicts a warp/render pipeline 1400 for multi-field (color) virtual content, according to some embodiments. The pipeline 1400 embodies two aspects: (1) multiple-stage/decoupled warping and (2) cadence variation between application frames and illumination frames.

(1) Multiple-Stage/Decoupled Warping

The pipeline 1400 includes one or more warping stages. At 1412, an application CPU ("client") generates virtual content, which is processed by an application GPU 252 to one or more (e.g., R, G, B) frames and poses 1414. At 1416, a warp/compositor CPU and its GPU 252 performs a first warp using a first estimated pose for each frame. Later in the pipeline 1400 (i.e., closer to illumination), a warp unit 1420 performs a second warp for each frame 1422R, 1422G, 1422B using a second estimated pose for each frame. The second estimated poses may be more accurate than the respective first estimated poses because the second estimated poses are determined closer to illumination. The twice warped frames 1422R, 1422G, 1422B are displayed at t0, t1, and t2.

The first warp may be a best guess that may be used to align the frames of virtual content for later warping. This may be a calculation intensive warp. The second warp may be a sequential corrective warp of respective once warped frames. The second warp may be a less calculation intensive warp to reduce the time between the second estimation of poses and display/illumination, thereby increasing accuracy.

(2) Cadence Variation

In some embodiments, cadences (i.e., frame rate) of the client or application and the display or illumination may not match. In some embodiments, an illumination frame rate may be twice an application frame rate. For instance, the illumination frame rate may be 60 Hz and the application frame rate may be 30 Hz.

In order to address warping issues with such a cadence mismatch, the pipeline 1400 generates two sets of twice warped frames 1422R, 1422G, 1422B (for projection at t0-t2) and 1424R, 1424G, 1424B (for projection at t3-t5) per frame 1414 from the application CPU 1412 and GPU 252. Using the same frame 1414 and first warped frame 1418, the warp unit 1420 sequentially generates first and second sets of twice warped frames 1422R, 1422G, 1422B and 1424R, 1424G, 1424B. This provides twice the number of warped frames 1422, 1424 per application frame 1414. The second warp may be a less calculation intensive warp to further reduce processor/power demand and heat generation.

While the pipeline 1400 depicts a 2:1 illumination/application ratio, that ratio may vary in other embodiments. For instance, the illumination/application ratio may be 3:1, 4:1, 2.5:1, and the like. In embodiments with fractional ratios, the most recently generated application frame 1414 may be used in the pipeline.

Alternative Color Break Up Minimizing Method

Figure 15:
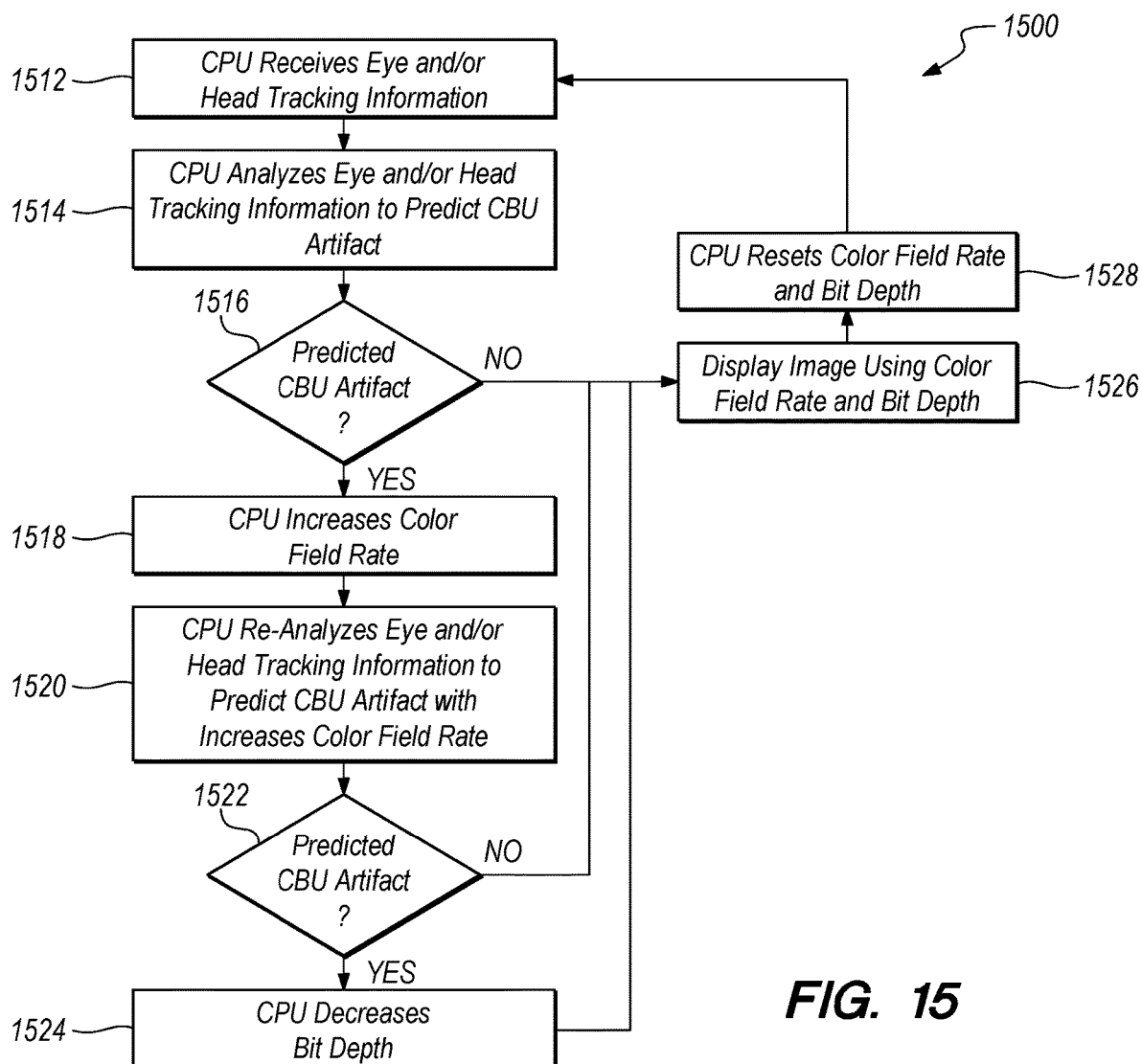
FIG. 15 depicts a method of minimizing Color Break Up artifact in warping multi-field (color) virtual content, according to some embodiments.

FIG. 15 depicts a method 1500 of minimizing color break up (CBU) artifact in warping multi-field (color) virtual content for a sequential display, according to some embodiments. At step 1512, a CPU receives eye and/or head tracking information (e.g., from eye tracking cameras or IMUs). At step 1514, the CPU analyzes the eye and/or head tracking information to predict a CBU artifact (e.g., based on characteristics of the display system). At step 1516, if CBU is predicted, the method 1500 proceeds to step 1518 where the CPU increases the color field rates (e.g., from 180 Hz to 360 Hz). At step 1516, if CBU is not predicted, the method 1500 proceeds to step 1526, where the image (e.g., split and warped field information) is displayed using the system default color field rate and bit depth (e.g., 180 Hz and 8 bits).

After increasing the color field rate at step 1518, the system re-analyzes the eye and/or head tracking information to predict a CBU artifact, at step 1520. At step 1522, if CBU is predicted, the method 1500 proceeds to step 1524 where the CPU decreases the bit depth (e.g., from 8 bit to 4 bit). After decreasing the bit depth, the image (e.g., split and warped field information) is displayed using the increased color field rate and the decreased bit depth (e.g., 360 Hz and 4 bits).

At step 1522, if CBU is not predicted, the method 1500 proceeds to step 1526, where the image (e.g., split and warped field information) is displayed using the increased color field rate and the system default bit depth (e.g., 180 Hz and 8 bits).

After the image (e.g., split and warped field information) is displayed using the adjusted or system default color field rate and bit depth, the CPU resets the color field rate and bit depth to the system default values at step 1528 before returning to step 1512 to repeat the method 1500.

By adjusting the color field rate and the bit depth in response to predicted CBU, the method 1500 depicted in FIG. 15 illustrates a method of minimizing CBU artifacts. The method 1500 may be combined with the other methods (e.g., method 800) described herein to further reduce CBU artifacts. While most of the steps in the method 1500 depicted in FIG. 15 are performed by the CPU, some or all of these steps can instead be performed by a GPU or dedicated component.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A computer implemented method for warping multi-field color virtual content for sequential projection, the method comprising:
   obtaining first and second color fields having different first and second colors;
   predicting a first intermediate head pose;
   predicting a second intermediate head pose;
   generating an intermediate warped first color field by warping the first color field based on the first intermediate head pose;
   generating an intermediate warped second color field by warping the second color field based on the second intermediate head pose;
   determining a first time for projection of a warped first color field;
   determining a second time for projection of a warped second color field;
   predicting a first head pose corresponding to the first time;
   predicting a second head pose corresponding to the second time;
   generating the warped first color field by warping the intermediate warped first color field based on the first head pose; and
   generating the warped second color field by warping the intermediate warped second color field based on the second head pose,
   wherein generating the warped first color field is less calculation intensive than generating the intermediate warped first color field, and
   wherein generating the warped second color field is less calculation intensive than generating the intermediate warped second color field.

2. The method of claim 1, wherein the first color field comprises first color field information at an X, Y location.

3. The method of claim 2, wherein the first color field information comprises a first brightness in the first color.

4. The method of claim 3, wherein the second color field comprises second color field information at the X, Y location.

5. The method of claim 4, wherein the second color field information comprises a second brightness in the second color.

6. The method of claim 1, wherein the warped first color field comprises warped first color field information at a first warped X, Y location.

7. The method of claim 6, wherein the warped second color field comprises warped second color field information at a second warped X, Y location.

8. The method of claim 1, wherein warping the first color field based on the first head pose comprises applying a first transformation to the first color field to generate the warped first color field.

9. The method of claim 1, wherein warping the second color field based on the second head pose comprises applying a second transformation to the second color field to generate the warped second color field.

10. The method of claim 1, further comprising:
    sending the warped first and second color fields to a sequential projector; and
    the sequential projector sequentially projecting the warped first color field and the warped second color field.

11. The method of claim 10, wherein the warped first color field is projected at the first time, and wherein the warped second color field is projected at the second time.

12. The method of claim 1, wherein determining the first time for projection of the warped first color field comprises analyzing a frame rate and another characteristic of a related projection system.

13. The method of claim 1, wherein determining the second time for projection of the warped second color field comprises analyzing a frame rate and another characteristic of a related projection system.

14. A system for warping multi-field color virtual content for sequential projection, comprising:
    a warping unit to receive first and second color fields having different first and second colors for sequential projection, the warping unit comprising:
    a pose estimator to:
       determine first and second times for projection of respective warped first and second color fields;
       predict first and second intermediate head poses; and
       predict first and second head poses at respective first and second times; and
    a transform unit to:
       generate intermediate warped first and second color fields by warping the respective first and second color fields based on the respective first and second intermediate head poses; and
       generate the warped first and second color fields by warping the respective intermediate warped first and second color fields based on the respective first and second head poses,
    wherein generating the warped first and second color fields is less calculation intensive than generating the intermediate warped first and second color fields.

15. The system of claim 14, wherein determine the first and second times for projection of the respective warped first and second color fields comprises analyzing a frame rate and another characteristic of a related projection system.

16. A computer program product embodied in a non-transitory computer readable medium, the computer readable medium having stored thereon a sequence of instructions which, when executed by a processor causes the processor to execute a method for warping multi-field color virtual content for sequential projection, the method comprising:
    obtaining first and second color fields having different first and second colors;
    predicting a first intermediate head pose;
    predicting a second intermediate head pose;
    generating an intermediate warped first color field by warping the first color field based on the first intermediate head pose;

generating an intermediate warped second color field by warping the second color field based on the second intermediate head pose;
determining a first time for projection of a warped first color field;
determining a second time for projection of a warped second color field;
predicting a first head pose corresponding to the first time;
predicting a second head pose corresponding to the second time;
generating the warped first color field by warping the intermediate warped first color field based on the first head pose; and
generating the warped second color field by warping the intermediate warped second color field based on the head second pose,
wherein generating the warped first color field is less calculation intensive than generating the intermediate warped first color field, and
wherein generating the warped second color field is less calculation intensive than generating the intermediate warped second color field.

17. The computer program product of claim 16, wherein determining the first time for projection of the warped first color field comprises analyzing a frame rate and another characteristic of a related projection system.

18. The computer program product of claim 16, wherein determining the second time for projection of the warped second color field comprises analyzing a frame rate and another characteristic of a related projection system.

* * * * *